US011480584B2

(12) United States Patent
Boo et al.

(10) Patent No.: US 11,480,584 B2
(45) Date of Patent: Oct. 25, 2022

(54) BIOLOGICAL ANALYSIS SYSTEM AND METHODS

(71) Applicants: Life Technologies Holdings PTE Limited, Singapore (SG); Life Technologies Corporation, Carlsbad, CA (US)

(72) Inventors: Kuan Moon Boo, Singapore (SG); Wei Fuh Teo, Singapore (SG); Zeqi Tan, Singapore (SG); Soo Yong Lau, Singapore (SG); Ming Tiong Sia, Singapore (SG); Woon Liang Soh, Singapore (SG); Ching Yee Lam, Singapore (SG); Shan Hua Dong, Singapore (SG); Marc Haberstroh, San Jose, CA (US); Michael C. Pallas, San Bruno, CA (US); Hardeep Sangha, Union City, CA (US)

(73) Assignees: LIFE TECHNOLOGIES HOLDINGS PTE LIMITED, Singapore (SG); LIFE TECHNOLOGIES CORPORATION, Carlsbad, CA (US)

(*) Notice: Subject to any disclaimer, the term of this patent is extended or adjusted under 35 U.S.C. 154(b) by 167 days.

(21) Appl. No.: 16/777,820

(22) Filed: Jan. 30, 2020

(65) Prior Publication Data

US 2020/0241023 A1    Jul. 30, 2020

Related U.S. Application Data

(60) Provisional application No. 62/832,820, filed on Apr. 11, 2019, provisional application No. 62/798,956, filed on Jan. 30, 2019.

(51) Int. Cl.
*G01N 35/00* (2006.01)
*B01L 3/00* (2006.01)
(Continued)

(52) U.S. Cl.
CPC ........ *G01N 35/00732* (2013.01); *B01L 3/508* (2013.01); *B01L 7/52* (2013.01);
(Continued)

(58) Field of Classification Search
None
See application file for complete search history.

(56) References Cited

U.S. PATENT DOCUMENTS

| 2006/0166371 | A1* | 7/2006 | Testa | G01N 1/31 436/174 |
| 2009/0269835 | A1* | 10/2009 | Ceremony | B01L 7/52 435/286.2 |
| 2012/0128459 | A1* | 5/2012 | Hoyer | G01N 35/04 414/754 |

FOREIGN PATENT DOCUMENTS

| EP | 0955097 A1 | 11/1999 |
| WO | WO-0108801 A1 | 2/2001 |

(Continued)

OTHER PUBLICATIONS

PCT/US2020/015970, International Search Report and Written Opinion, dated Jul. 2, 2020, 17 pages.

*Primary Examiner* — Matthew D Krcha
(74) *Attorney, Agent, or Firm* — Mauriel Kapouytian Woods LLP; Michael Mauriel

(57) ABSTRACT

A system for biological analysis includes a housing, a block assembly within the housing having a sample block and a baseplate, a heated cover and a cover carrier. The sample block receives a sample holder comprising an RFID tag. A first drive mechanism generates relative movement between the sample block and the baseplate along a first axis. A second drive mechanism generates relative movement between the heated cover and the cover carrier along a second axis that is different from the first axis. Based on a first command the first drive mechanism releasably engages
(Continued)

the sample block and operates the second drive mechanism to releasably engage the heated cover with the cover carrier. The system also includes first and second RFID antennas that receive RFID data from the sample holder RFID tag that is read by at least one RFID reader.

10 Claims, 34 Drawing Sheets

(51) Int. Cl.
*B01L 7/00* (2006.01)
*G06K 7/10* (2006.01)
*G06K 19/07* (2006.01)
*G10L 15/22* (2006.01)
*G06V 40/16* (2022.01)

(52) U.S. Cl.
CPC ..... *G06K 7/10316* (2013.01); *G06K 19/0723* (2013.01); *B01L 2200/025* (2013.01); *B01L 2300/021* (2013.01); *B01L 2300/046* (2013.01); *B01L 2300/0609* (2013.01); *B01L 2300/0663* (2013.01); *B01L 2300/0893* (2013.01); *G01N 2035/00762* (2013.01); *G06V 40/172* (2022.01); *G10L 15/22* (2013.01); *G10L 2015/223* (2013.01)

(56) References Cited

FOREIGN PATENT DOCUMENTS

| | | |
|---|---|---|
| WO | WO-02078849 A1 | 10/2002 |
| WO | WO-2008018904 A2 | 2/2008 |
| WO | WO-2009102924 A1 | 8/2009 |

\* cited by examiner

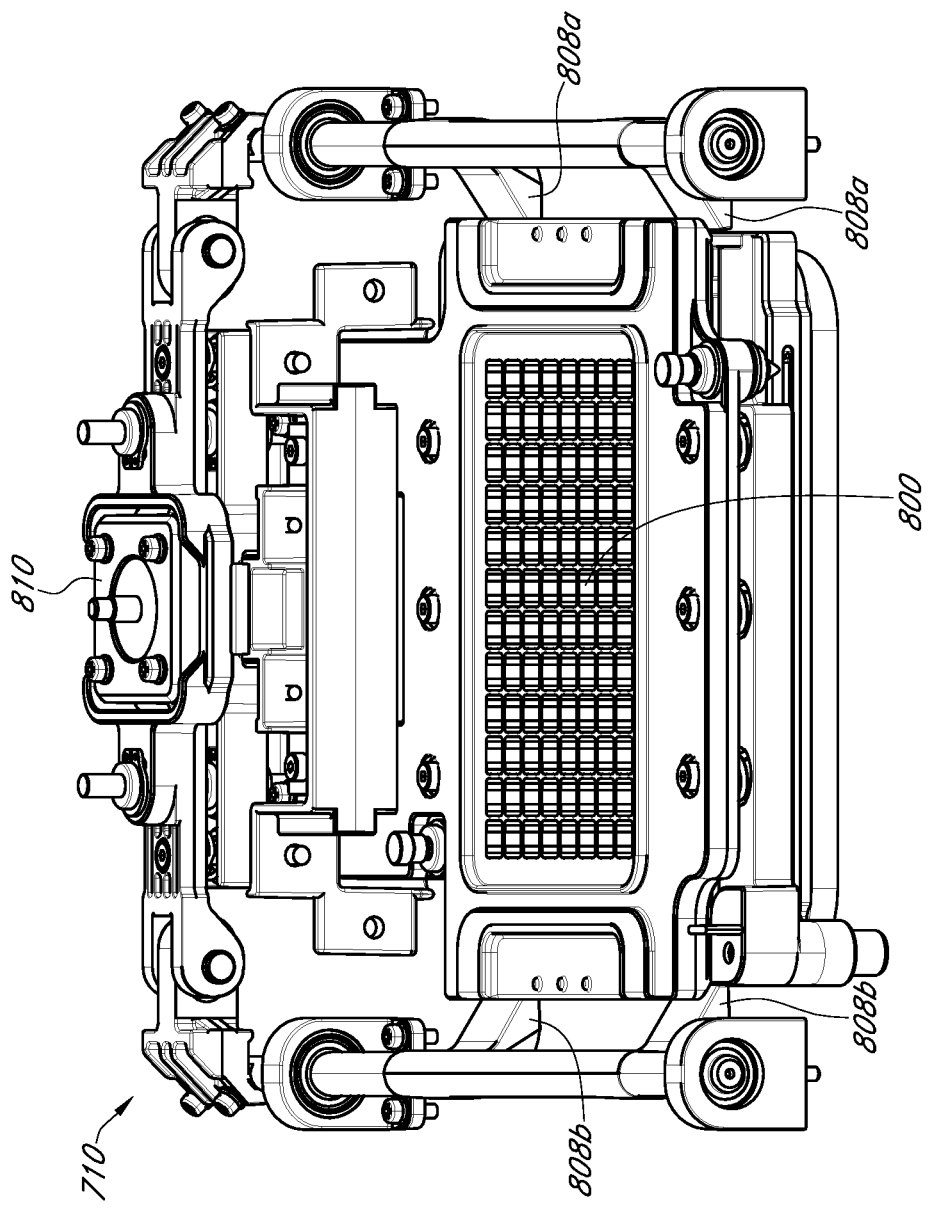

BIOLOGICAL ANALYSIS SYSTEM AND METHODS

CROSS-REFERENCE TO RELATED APPLICATIONS

This application claims priority to U.S. Provisional Application No. 62/798,956, filed Jan. 30, 2019 and 62/832,820, filed Apr. 11, 2019, both of which disclosures are herein incorporated by reference in their entirety.

FIELD OF THE DISCLOSURE

The present disclosure relates broadly, but not exclusively, to biological analysis systems and related methods, including polymerase chain reaction (PCR) systems.

BACKGROUND

Biological analysis systems, such as PCR systems, are useful tools for conducting diagnostics and research in biological or biochemical samples. A PCR system typically has a thermal cycler that heats and cools the samples over a number of cycles to achieve the desired amplification of one or more target molecules. Real-time PCR systems, also known as qualitative PCR (qPCR) systems allow monitoring of a PCR assay during each thermal cycle of the process.

Generally, there is an increasing need to simplify the installation and setup of biological analysis systems so that operators can more quickly and efficiently use biological analysis systems for their intended purpose. However, existing systems typically require manual operation or intervention which may result in inefficiency and inconsistency.

Thus, it is desirable to provide a biological analysis system that can address at least one of the above problems.

BRIEF DESCRIPTION OF THE DRAWINGS

Embodiments of the present disclosure will be better understood and readily apparent to one of ordinary skill in the art from the following written description, by way of example only, and in conjunction with the drawings, in which:

FIGS. 9A-9H and 9J-9K show various views a cover carrier according to an example embodiment.

DETAILED DESCRIPTION

Figure 1:
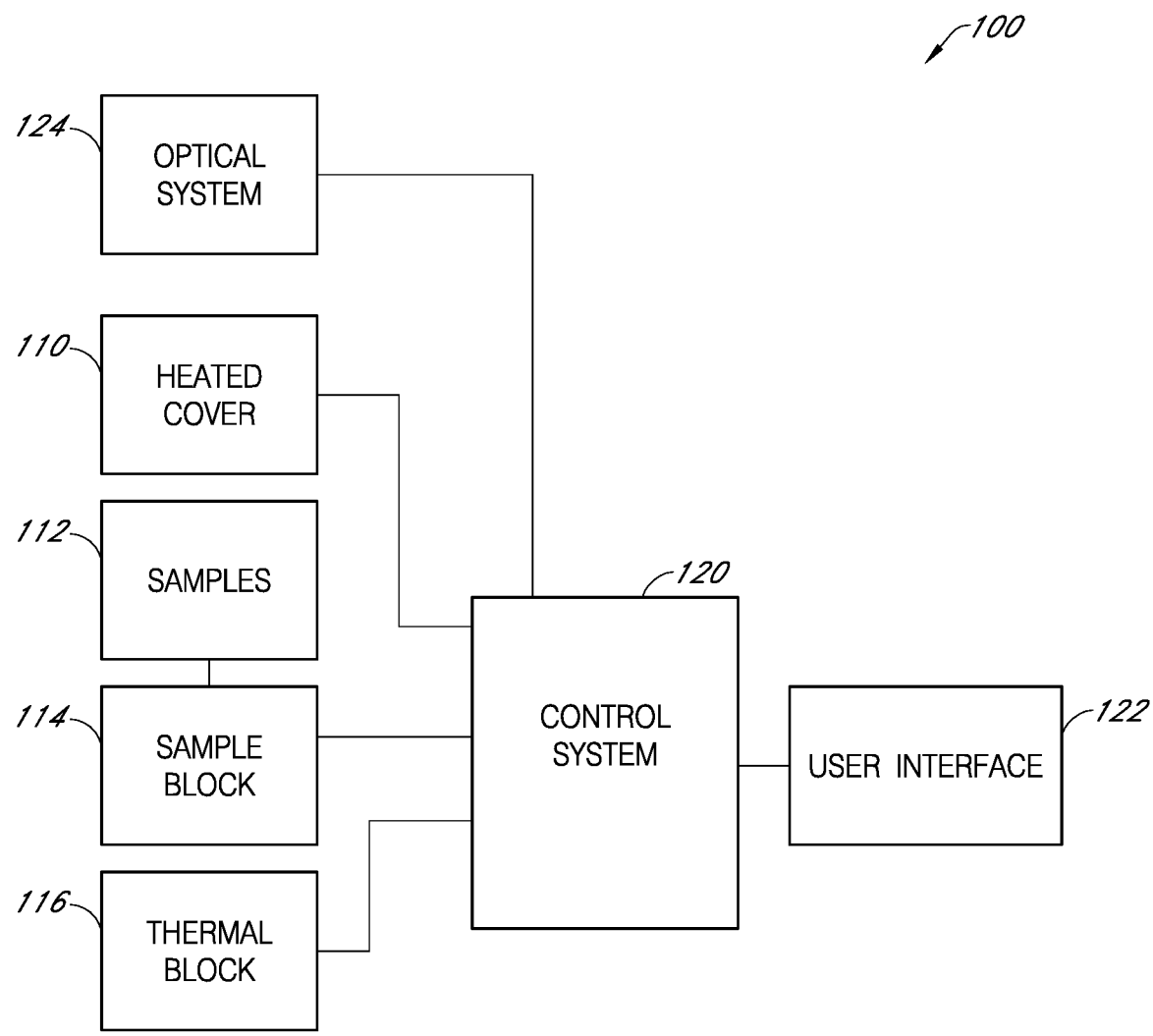
FIG. 1 shows a block diagram that illustrates a PCR instrument upon which embodiments of the present teachings may be implemented.

To provide a more thorough understanding of the present disclosure, the following description sets forth numerous specific details, such as specific configurations, parameters, examples, and the like. It should be recognized, however, that such description is not intended as a limitation on the scope of the present invention, but is intended to provide a better description of the exemplary embodiments.

It should also be recognized that the methods and systems described herein may be implemented in various types of systems, instruments, and machines such as biological analysis systems. For example, various embodiments may be implemented in an instrument, system or machine that performs polymerase chain reactions (PCR) on a plurality of samples. While generally applicable to quantitative polymerase chain reactions (qPCR) where a large number of samples are being processed, it should be recognized that any suitable PCR method may be used in accordance with various embodiments described herein. Suitable PCR methods include, but are not limited to, digital PCR, allele-specific PCR, asymmetric PCR, ligation mediated PCR, multiplex PCR, nested PCR, qPCR, genome walking, and bridge PCR, for example. Furthermore, as used herein, thermal cycling may include using a thermal cycler, isothermal amplification, thermal convection, infrared mediated thermal cycling, or helicase dependent amplification.

The term "radio frequency identifier", "radio frequency identifier tag", or "RFID tag" as used herein may refer to a chip comprising an integrated circuit and an antenna. The integrated circuitry may store data that can be communicated by a radio frequency transmitted by the antenna. The integrated circuit and antenna circuitry may be printed on the chip. An RFID "tag" or "transponder" can be read by an RFID reader using an antenna that emits radio frequencies to query the transponder. A "passive RFID" does not have its own energy source, but responds to signals from a reader to transmit a signal. An "active RFID" includes a battery as a power source. Some examples of RFID tags can be found in U.S. Pat. Nos. 6,147,662; 6,917,291; 5,949,049; 6,652,812; 6,112,152; and U.S. Patent Application No. 2003/0183683 all of which are herein incorporated by reference in their entireties for their disclosure of RFID tags, chips, labels, or devices, RFID readers, and RFID systems, their design and use. A "writable radio frequency identifier" or "writable RFID" is an RFID tag that has memory space that can be written to by an RFID writer.

The term "sample holder" as used herein may refer to a structure for directly or indirectly supporting one or more reaction sites, each configured to contain a biological sample and any associated reagents, dyes, probes, detergents, enzymes, master mixes, or the like. Examples of sample holders include, but are not limited to, reaction plates, tubes, tube carriers, surface plasmon resonance arrays, slides, conical low-volume tubes, microfluidic cards, microarray chips, plates or cartridges, through-hole arrays, sample preparation devices, assay preparation devices, electrophoretic type device, electroosmotic type devices, immunoassays, combinatorial libraries, molecular libraries, phage display libraries, DNA libraries, DNA fingerprinting devices, SNP detection devices, vacuum containers, and other types of containers for supporting biological reagents or assays. The sample holder can be a multi-well tray or microtiter plate including, for example, 4, 12, 24, 48, 96, 192, 384, 768, 1536, 3072, 6144, 12288, or more wells or sample retainment regions. The sample holder can retain a fluid, if the sample holder can be utilized to transfer, contain, encompass, or otherwise hold, permanently or temporarily, a fluid. The sample holder material can comprise any materials used in chemical and biochemical synthesis. The sample holder material can comprise polymeric materials that are compatible with chemical and biological syntheses and assays, and include glasses, silicates, celluloses, polystyrenes, polysaccharides, sand, and synthetic resins and polymers, including acrylamides, particularly cross-linked polymers, cotton, and other such materials. The sample holder material can be in the form of particles or can be continuous in design, such as a test tube or microtiter plate or the like.

As used herein, the terms "communication", "electrical communication", or "electronic communication" generally means communication between two or more electronic components (e.g., electronic devices or electronic systems). The communication may be achieved via a physical connection between (e.g., an electrical wire, an electrical cable, fiber optic cable, or the like connected to both two electronic components or via a third electronic component to which first and second communicating components are commonly connected, for example, a network system such as a Local Area Network (LAN), or a wide area network (WAN), or the like). Additionally or alternatively, the electrical communication may be via a transmitter/receiver configuration, for example, a direct wireless communication between the devices (e.g., between antennas in two communicating components, a Bluetooth connection, and/or the like) or via wireless network (e.g., a wireless router system, Wi-Fi connection, or wireless data communication system, such as provided by a telecommunications provider). The electrical communication may additionally or alternatively be provided via communication of the device to a common database, such as a Cloud database.

System Overview

As mentioned above, an instrument according to embodiments of the present teaching may be utilized to perform various types of biological assays, experiments, tests, or the like. In the current disclosure, embodiments of an instrument for use in conducting polymerase chain reaction (PCR) assays are illustrated using a microtiter plate. However, embodiments of the present teaching extend to other types of instruments (e.g. capillary electrophoresis instruments, sequencing instruments, such as Next Generation Sequencing (NGS) instruments, microarray systems, flow cytometers, and the like), sample holders (e.g., as discussed above herein), and assays such (e.g., capillary electrophoresis, genetic sequencing, genotyping, and the like).

FIG. 1 shows a block diagram that illustrates elements of an instrument 100, such as a Real-time PCR instrument 100, upon which embodiments of the present teachings may be implemented. Real-time PCR instrument 100 may include a heated cover 110 that is placed over a plurality of samples 112 contained in a substrate, plate, or sample holder (not shown here). In various embodiments, a sample holder may be a glass or plastic slide with a plurality of sample regions, which sample regions have a cover between the sample regions and heated cover 110. The sample holder may comprise one or more reaction sites in various embodiments, which may include depressions, wells, through-holes, indentations, surface discontinuities, ridges, and combinations thereof, which may be patterned in regular or irregular arrays formed on the surface of the sample holder. The PCR instrument also includes a sample block 114 for holding or maintaining a plurality of samples and a thermal block 116 for heating and/or cooling the sample block 114 and the samples contained therein. Blocks 114 and 116 may be coupled or connected together to from an integral sample block or sample block assembly 114.

Figure 2:
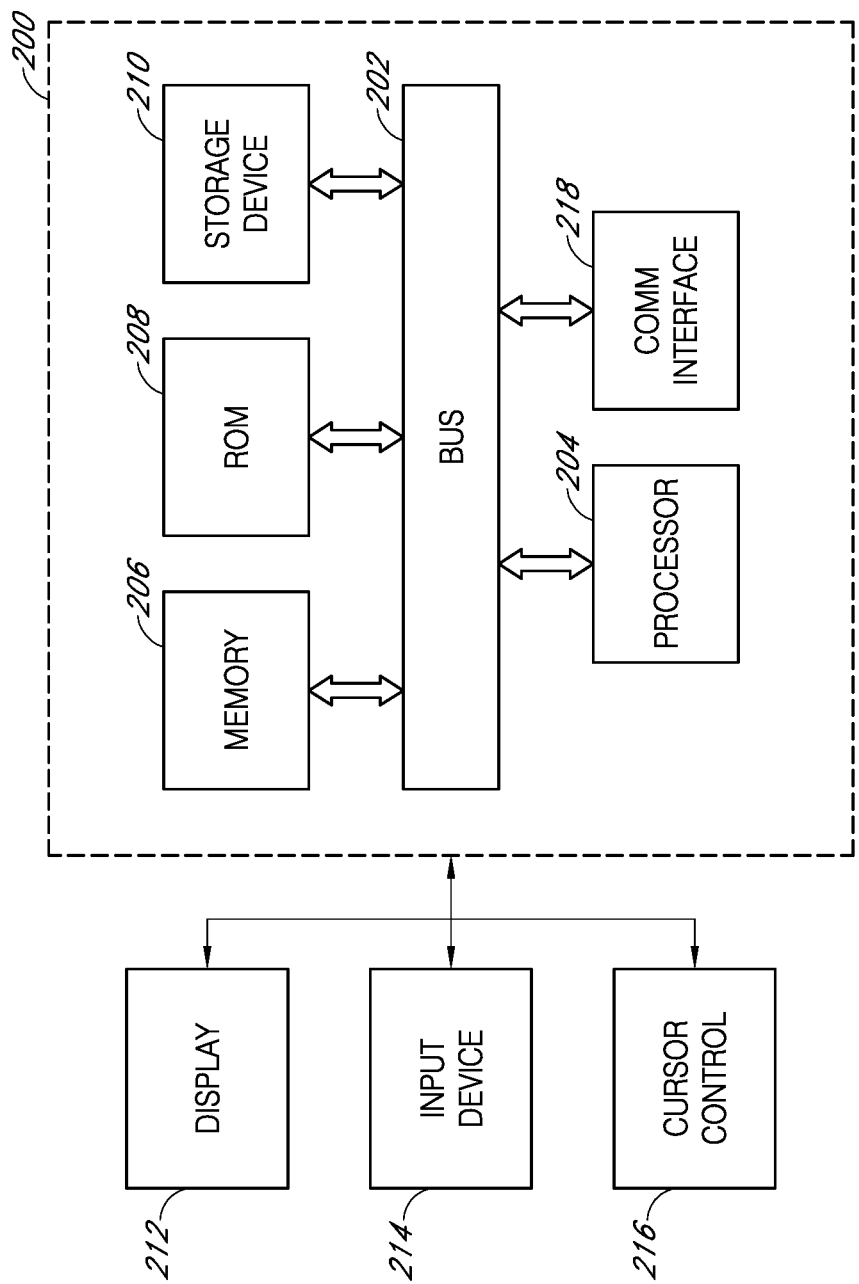
FIG. 2 shows a block diagram that illustrates a computer system that may be employed to carry out processing functionality, according to some exemplary embodiments of the disclosure.

Real-time PCR instrument 100 has an optical system 124. In FIG. 1, the optical system 124 may have an illumination source (not shown) that emits electromagnetic energy, an optical sensor, detector, or imager (not shown), for receiving electromagnetic energy from samples 112 in a sample holder, and optics 140 used to guide the electromagnetic energy from each DNA sample to the imager. For embodiments of PCR instrument/real-time PCR instrument 100 in FIG. 1, control system 120 may be used to control the functions of the detection system, heated cover, and thermal block. Control system 120 may be accessible to an end user through user interface 122 of PCR instrument/real-time PCR instrument 100 in FIG. 1. Also a computer system 100, as depicted in FIG. 2, may serve as to provide the control the function of PCR instrument 100 in FIG. 1, as well as the user interface function. Additionally, computer system 200 of FIG. 2 may provide data processing, display and report preparation functions. All such instrument control functions may be dedicated locally to the PCR instrument, or computer system 200 of FIG. 2 may provide remote control of part or all of the control, analysis, and reporting functions, as will be discussed in more detail subsequently.

Computer-Implemented System

Methods in accordance with embodiments described herein may be implemented using a computer system.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on non-transitory computer-readable media. Some other processes can be implemented using analog circuitry, as is well known to one of ordinary skill in the art. Additionally, memory or other storage, as well as communication components, may be employed in embodiments of the invention.

FIG. 2 shows a block diagram that illustrates a computer system 200 that may be employed to carry out processing functionality, according to various embodiments. Instruments to perform experiments may be connected to the exemplary computing system 200. Computing system 200 can include one or more processors, such as a processor 204. Processor 204 can be implemented using a general or special purpose processing engine such as, for example, a microprocessor, controller or other control logic. In this example, processor 204 is connected to a bus 202 or other communication medium.

Further, it should be appreciated that a computing system 200 of FIG. 2 may be embodied in any of a number of forms, such as a rack-mounted computer, mainframe, supercomputer, server, client, a desktop computer, a laptop computer, a tablet computer, hand-held computing device (e.g., PDA, cell phone, smart phone, palmtop, etc.), cluster grid, netbook, embedded systems, or any other type of special or general purpose computing device as may be desirable or appropriate for a given application or environment. Additionally, a computing system 200 can include a conventional network system including a client/server environment and one or more database servers, or integration with LIS/LIMS infrastructure. A number of conventional network systems, including a local area network (LAN) or a wide area network (WAN), and including wireless and/or wired components, are known in the art. Additionally, client/server environments, database servers, and networks are well documented in the art. According to various embodiments described herein, computing system 200 may be configured to connect to one or more servers in a distributed network. Computing system 200 may receive information or updates from the distributed network. Computing system 200 may also transmit information to be stored within the distributed network that may be accessed by other clients connected to the distributed network.

Computing system 200 may include bus 202 or other communication mechanism for communicating information, and processor 204 coupled with bus 202 for processing information.

Computing system 200 also includes a memory 206, which can be a random access memory (RAM) or other dynamic memory, coupled to bus 202 for storing instructions to be executed by processor 204. Memory 206 also may be used for storing temporary variables or other intermediate information during execution of instructions to be executed by processor 204. Computing system 200 further includes a read only memory (ROM) 208 or other static storage device coupled to bus 202 for storing static information and instructions for processor 204.

Computing system 200 may also include a storage device 210, such as a magnetic disk, optical disk, or solid state drive (SSD) is provided and coupled to bus 202 for storing information and instructions. Storage device 210 may include a media drive and a removable storage interface. A media drive may include a drive or other mechanism to support fixed or removable storage media, such as a hard disk drive, a floppy disk drive, a magnetic tape drive, an optical disk drive, a CD or DVD drive (R or RW), flash drive, or other removable or fixed media drive. As these examples illustrate, the storage media may include a computer-readable storage medium having stored therein particular computer software, instructions, or data.

In alternative embodiments, storage device 210 may include other similar instrumentalities for allowing computer programs or other instructions or data to be loaded into computing system 200. Such instrumentalities may include, for example, a removable storage unit and an interface, such as a program cartridge and cartridge interface, a removable memory (for example, a flash memory or other removable memory module) and memory slot, and other removable storage units and interfaces that allow software and data to be transferred from the storage device 210 to computing system 200.

Computing system 200 can also include a communications interface 218. Communications interface 218 can be used to allow software and data to be transferred between computing system 200 and external devices. Examples of communications interface 218 can include a modem, a network interface (such as an Ethernet or other NIC card), a communications port (such as for example, a USB port, a RS-232C serial port), a PCMCIA slot and card, Bluetooth, etc. Software and data transferred via communications interface 218 are in the form of signals that can be electronic, electromagnetic, optical or other signals capable of being received by communications interface 218. These signals may be transmitted and received by communications interface 218 via a channel such as a wireless medium, wire or cable, fiber optics, or other communications medium. Some examples of a channel include a phone line, a cellular phone link, an RF link, a network interface, a local or wide area network, and other communications channels.

Computing system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204, for example. An input device may also be a display, such as an LCD display, configured with touchscreen input capabilities. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (e.g. x-axis) and a second axis (e.g. y-axis), that allows the device to specify positions in a plane. Computing system 200 provides data processing and provides a level of confidence for such data. Consistent with certain implementations of embodiments of the present teachings, data processing and confidence values are provided by computing system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process states described herein. Alternatively hard-wired circuitry may be used in place of or in combination with software instructions to implement embodiments of the present teachings. Thus implementations of embodiments of the present teachings are not limited to any specific combination of hardware circuitry and software.

The term "computer-readable medium" and "computer program product" as used herein generally refers to any media that is involved in providing one or more sequences or one or more instructions to processor 204 for execution. Such instructions, generally referred to as "computer program code" (which may be grouped in the form of computer programs or other groupings), when executed, enable the computing system 200 to perform features or functions of embodiments of the present invention. These and other forms of non-transitory computer-readable media may take many forms, including but not limited to, non-volatile media, volatile media, and transmission media. Non-volatile media includes, for example, solid state, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on magnetic disk of a remote computer. The remote computer can load the instructions into its dynamic memory and send the instructions over a telephone line using a modem. A modem local to computing system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 10A:
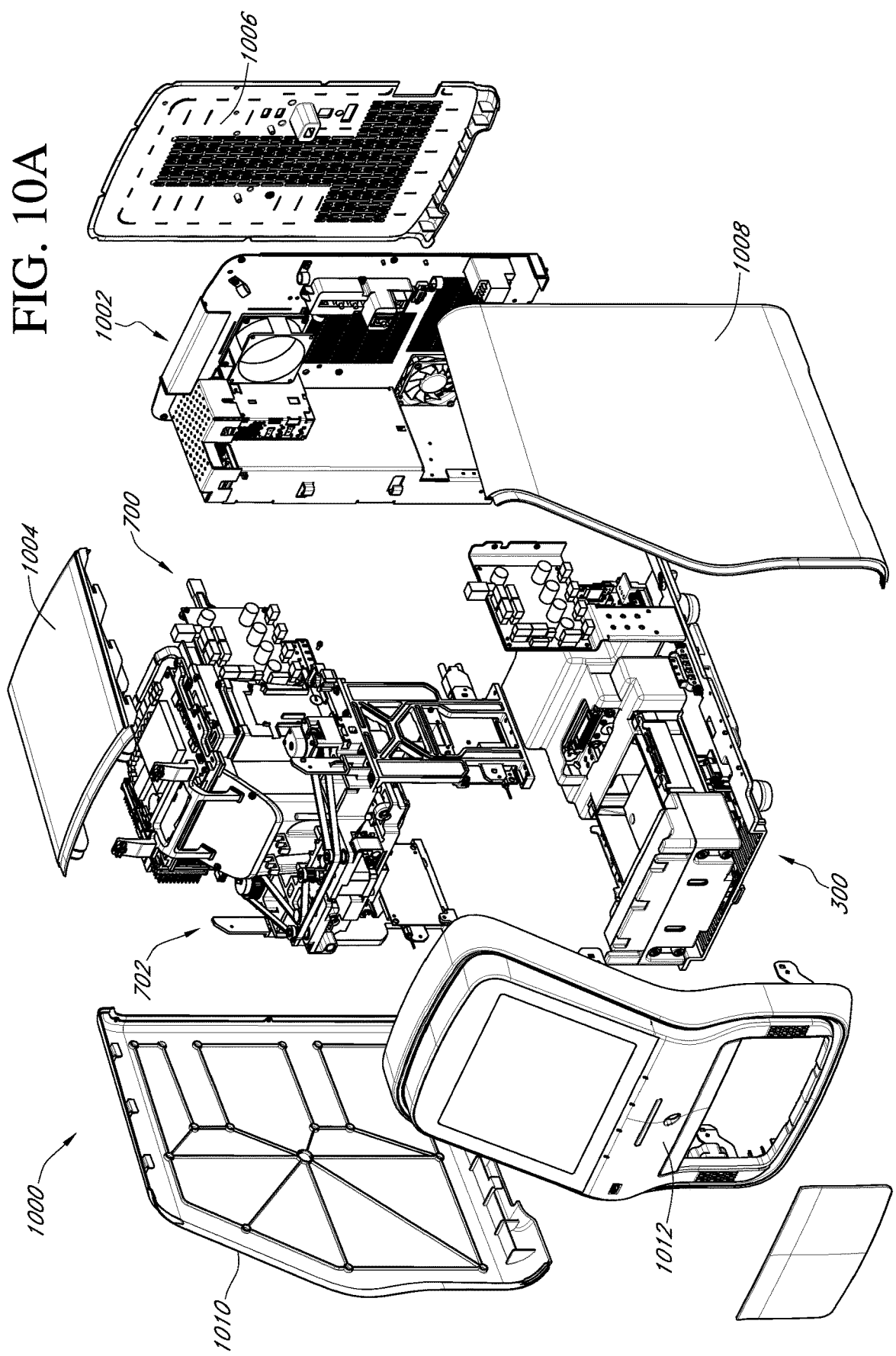
FIGS. 10A-10B show exploded and assembled views, respectively, of a biological analysis system according to an example embodiment and a reagent with RFID tag.
Figure 10B:
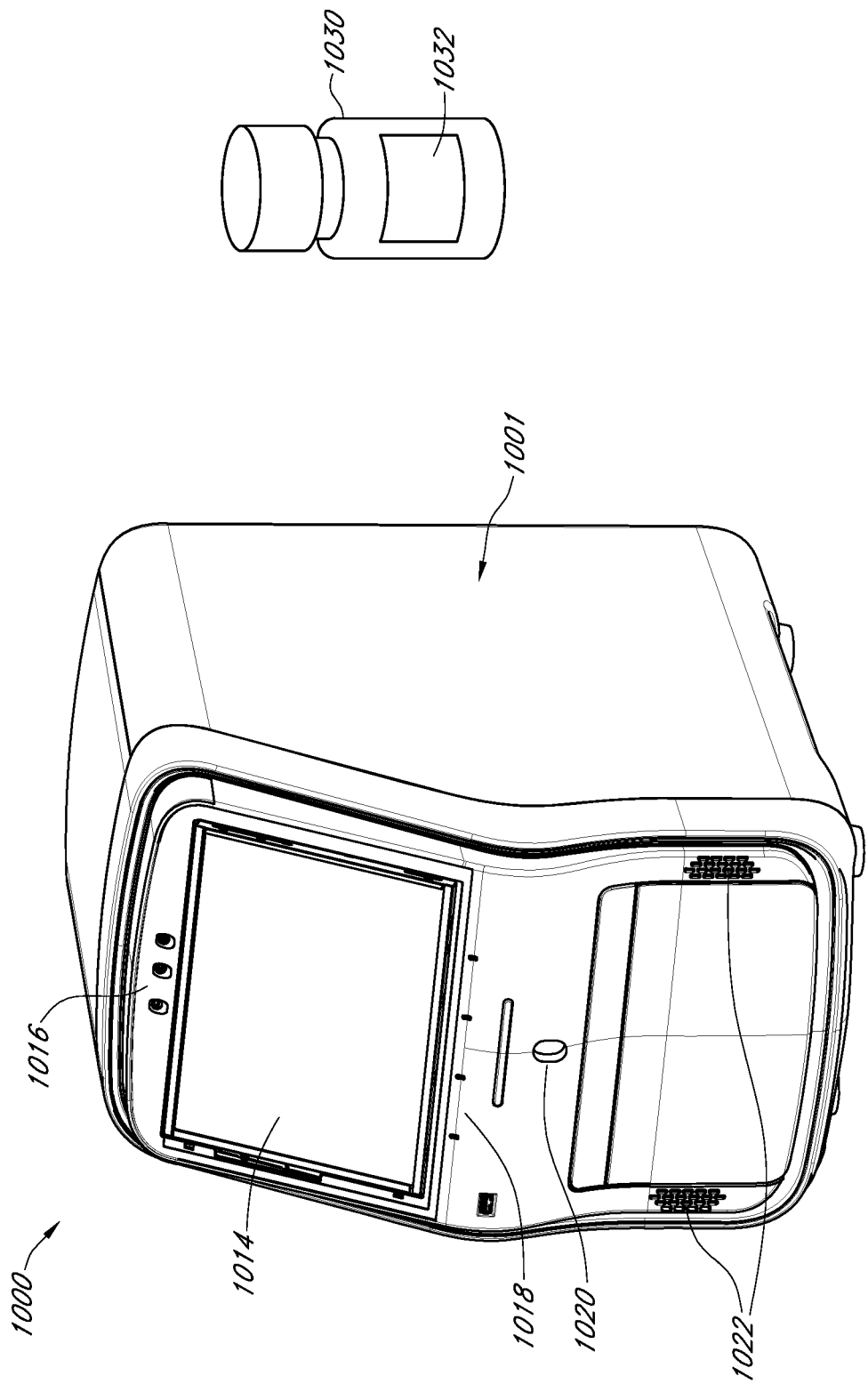

FIG. 10A shows an exploded perspective view of a biological analysis system or instrument 1000 according to an example embodiment. FIG. 10B shows an assembled perspective view of the system 1000 of FIG. 10A. The system 1000 may include a baseplate, frame, or support structure 301 and a housing, enclosure, or case 1001 that is used to house, isolate, and/or protect the various components, assemblies, and sub-assemblies of the system 1000. System 1000 may further comprise a frame 704, which may be attached, secured, coupled to and/or supported by support structure 301. As discussed herein, the system or instrument 1000 comprises elements and systems pertaining to a qPCR system or instrument. However, the scope of the various embodiment disclose herein may cover other types of systems or instruments, such as other types of biological analysis systems or instruments, such as those listed above herein.

Figure 3A:
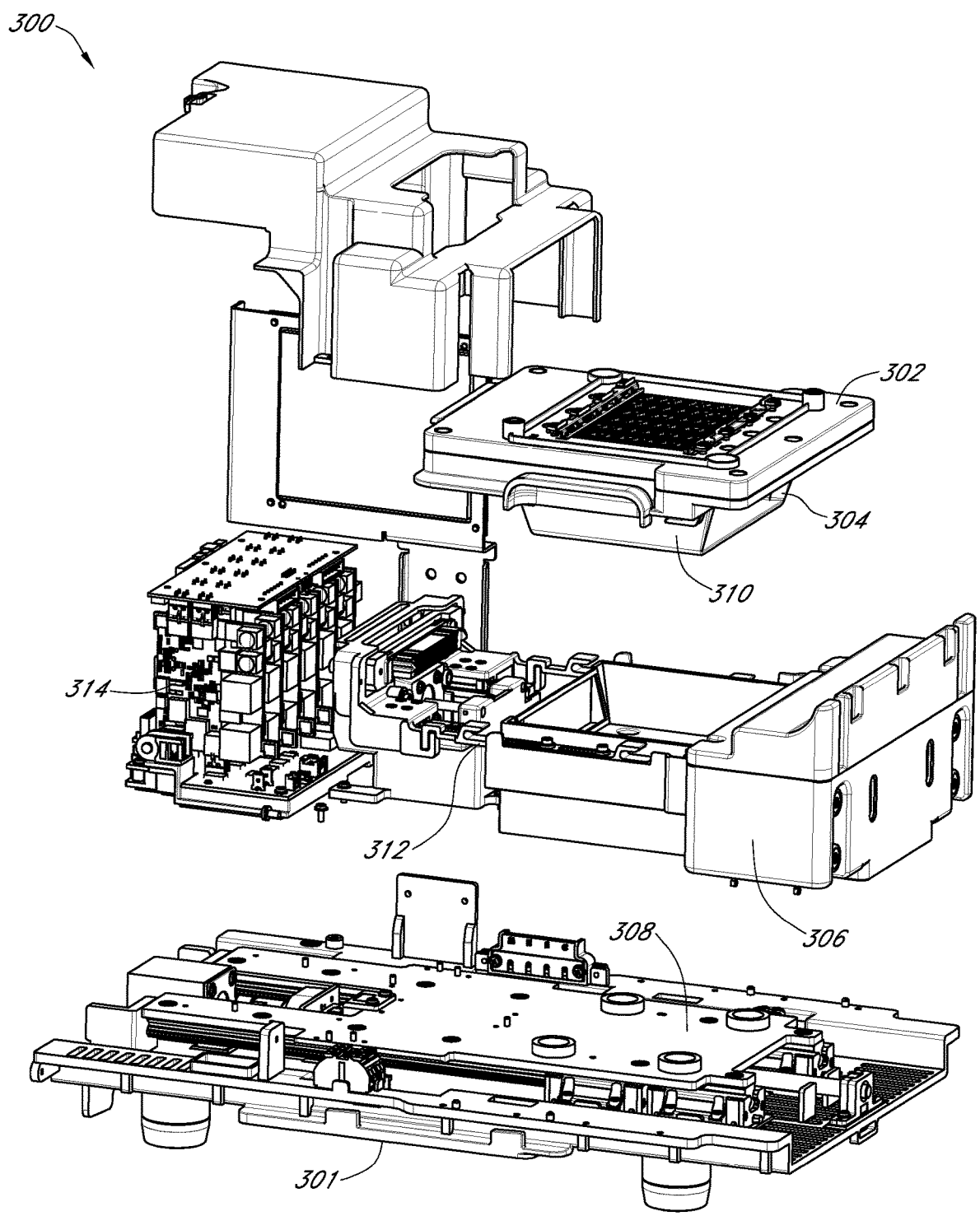
FIGS. 3A-3B show exploded and assembled views, respectively, of a block assembly according to an example embodiment.
Figure 3B:
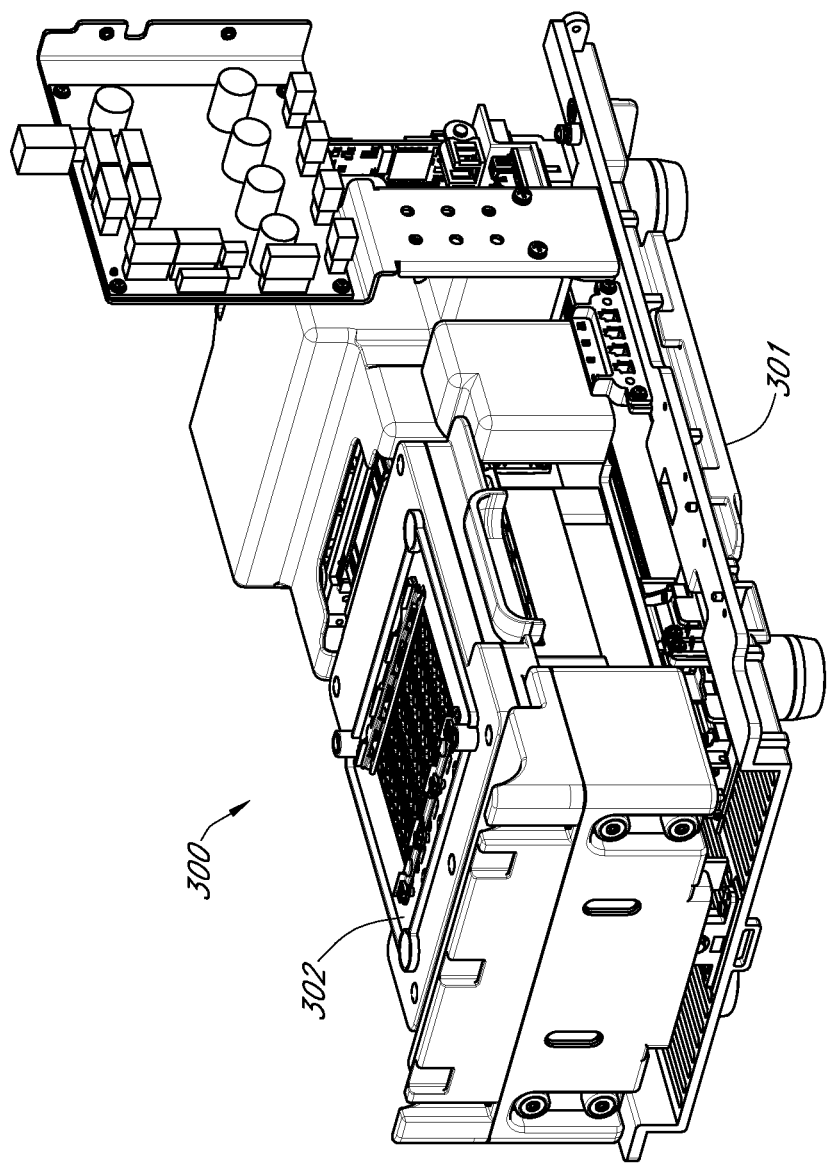

Referring to FIGS. 3A and 3B, the system 1000 may comprise a block assembly 300. FIG. 3A shows an exploded perspective view of the block assembly 300 according to an example embodiment. FIG. 3B shows an assembled perspective view of the block assembly 300 of FIG. 3A. With additional reference to FIGS. 3C and 3D, the block assembly 300 includes a sample block 302 comprising an upper surface 303 and a plurality of vessel or sample well or receiving elements 304. The receiving elements may be disposed within a rectangular area having a long side having a dimension "L" and a short side having a dimension "S" that is less than the dimension L, for example, when the block 302 is configured to receive a standard 96-well or 384-well microtiter plate. The sample block 302 may comprise a thermal block 305 that is mounted to, and in thermal contact with, the upper portion of sample block 302, which is configured to receive a sample holder or carrier. The thermal block 305 may comprise one or more elements for heating and/or cooling (not shown), such as thermoelectric elements, one or more thermal or heat sinks, one or more heat exchangers or fins, and/or one or more fans. The sample block 302 may be disposed in or on a movable support or base 308, which may include a carrier, base, or tray 306 configured to support, hold, or lock the sample block 302. The carrier 306 may be a separate component that is attached to moveable base 308 or may be integrally formed with moveable base 308.

Figure 3C:
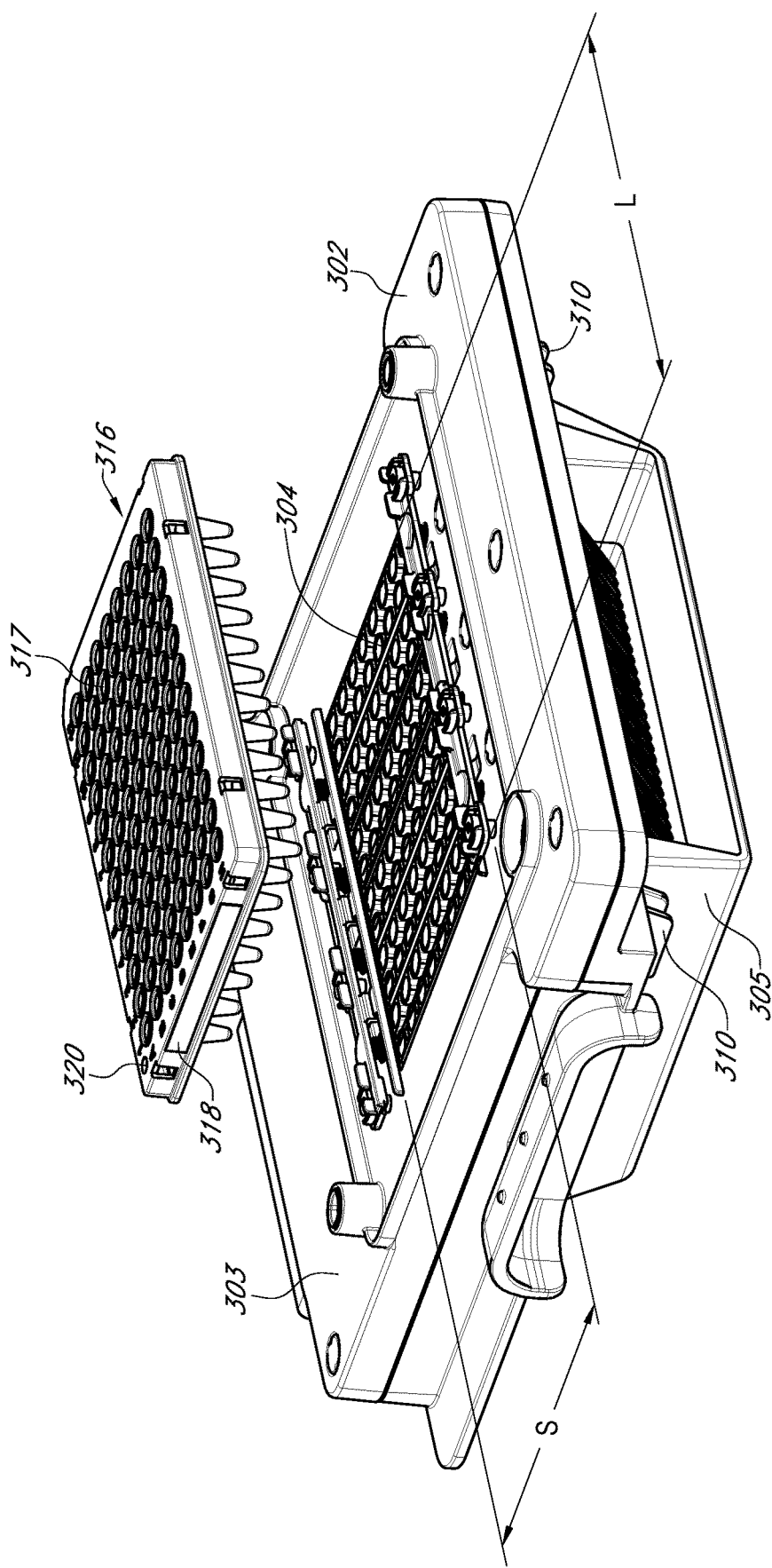
FIGS. 3C-3D show perspective views of sample block and sample holder according to an example embodiment.
Figure 3D:
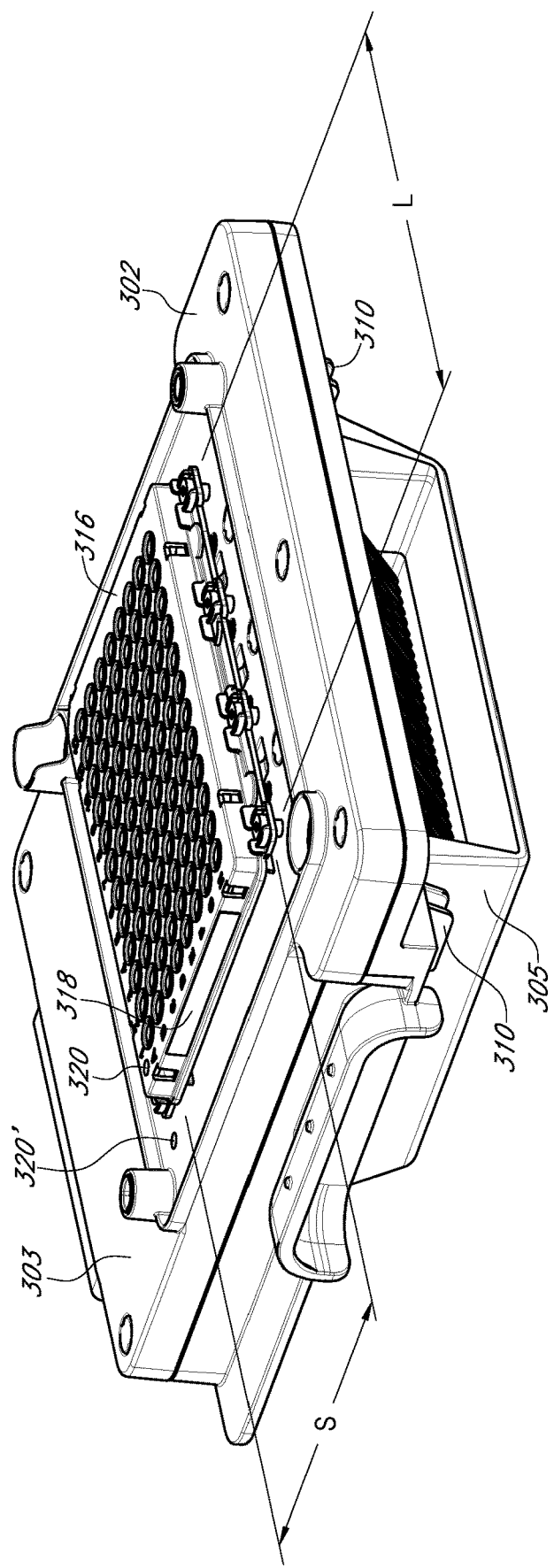
Figure 4A:
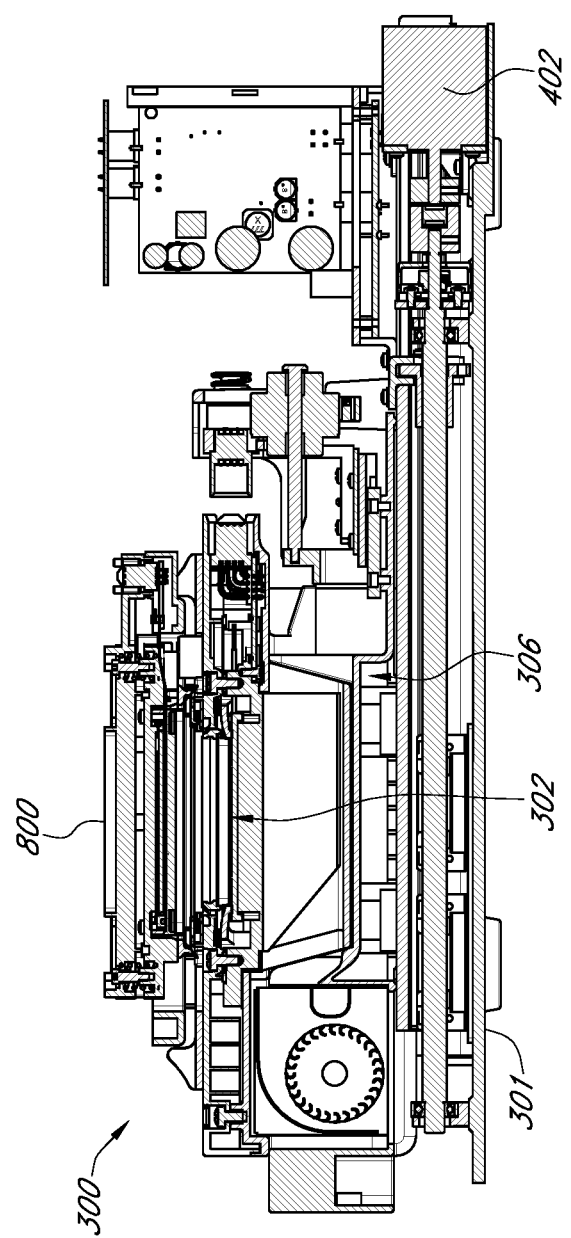
FIGS. 4A-4B show withdrawn and extended positions, respectively, of the block assembly of FIGS. 3A-3B according to an example embodiment.
Figure 4B:
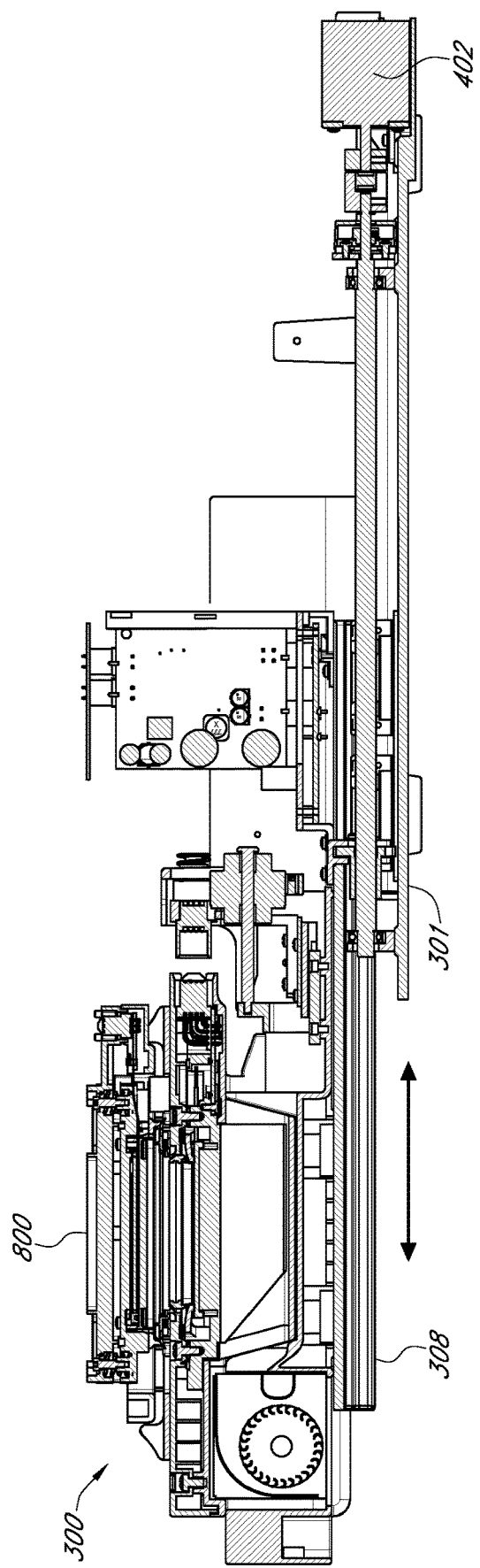

Still referring to FIGS. 3A-3D, and additional reference to FIGS. 4A and 4B, the sample block 302 may be configured to receive a sample holder 316. The sample holder 316 in the illustrated embodiment comprises a microtiter plate including a plurality of reaction sites 317 in the form wells, reaction volume in a fluidics card, through-holes, surface indentations or other surface discontinuities, or the like. In other embodiments, sample holder 316 may comprise one or more linear strips of reaction sites, a plurality of individual vials, a sample card, a microfluidics card, a through-hole array, or the like. The reactions sites 317 may alternatively comprise a plurality of through-holes or other formats discussed above herein. In certain embodiments, the block assembly 300 may also include a cover 800, which may be configured cover sample holder 316 and/or to protect and/or provide optical access to reaction sites 317. In the illustrated embodiments, cover 800 is a heated cover 800 that is configured to heat the top of sample holder 316, the top of the thermal block 302, and/or a volume above the sample holder 316 and/or thermal block 302. Alternatively, cover 800 may be a non-heated cover, for example, a cover plate to protect the content of sample holder 316, a plate with openings to provide optical access to reaction sites 317, and/or a lenslet array configured to focus light into or onto the reaction sites 317.

In certain embodiments, the sample block 302 may be located on or in a moveable base 308 configured to move or transport sample block 302 from a location inside the housing 1001 to a position suitable, for example along a horizontal axis as illustrated by the double arrow line in FIG. 4B. The moveable base 308 may be configured to move or transport sample block 302 along with the sample holder 316, when present, from a location inside the housing 1001 to a location completely or partially outside the housing 1001, for example, for exchanging the sample block 302 for a different sample block 302 (e.g., having a different format and/or reaction site density) and/or for exchanging the sample holder 316 for a different sample holder 316 (e.g., having different samples or number of reaction sites).

Figure 6A:
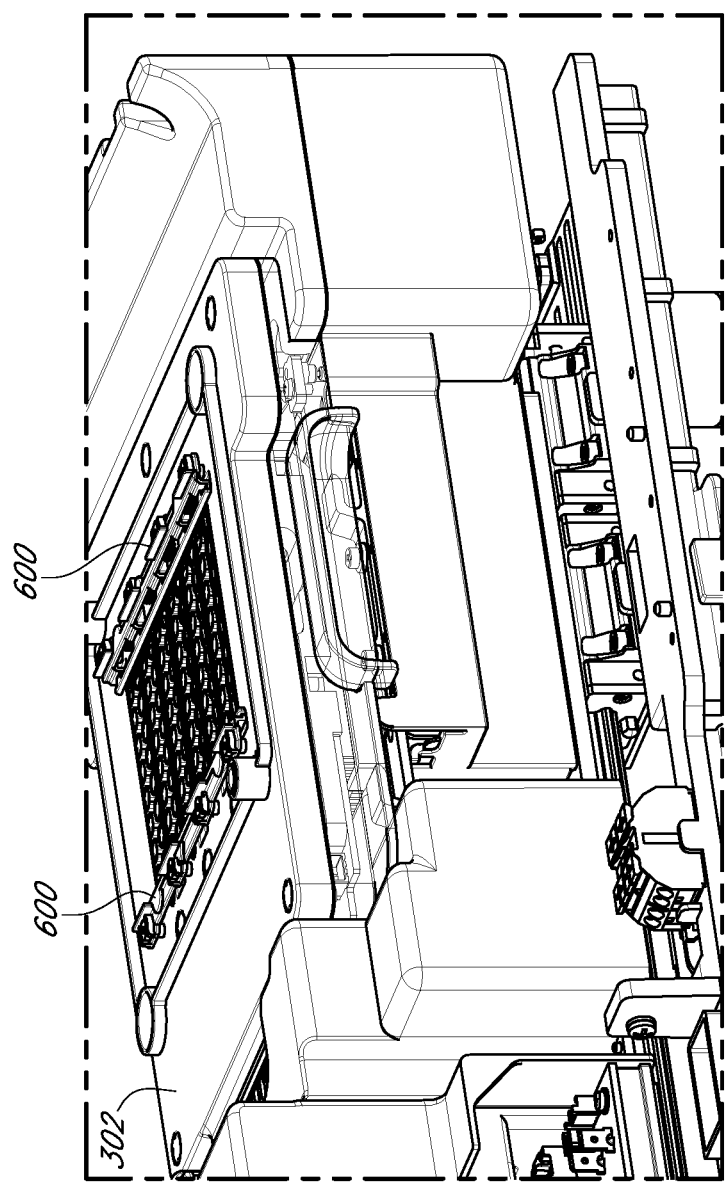
FIGS. 6A-6B shows magnified views of portions of the block assembly of FIGS. 3A-3B.
Figure 6B:
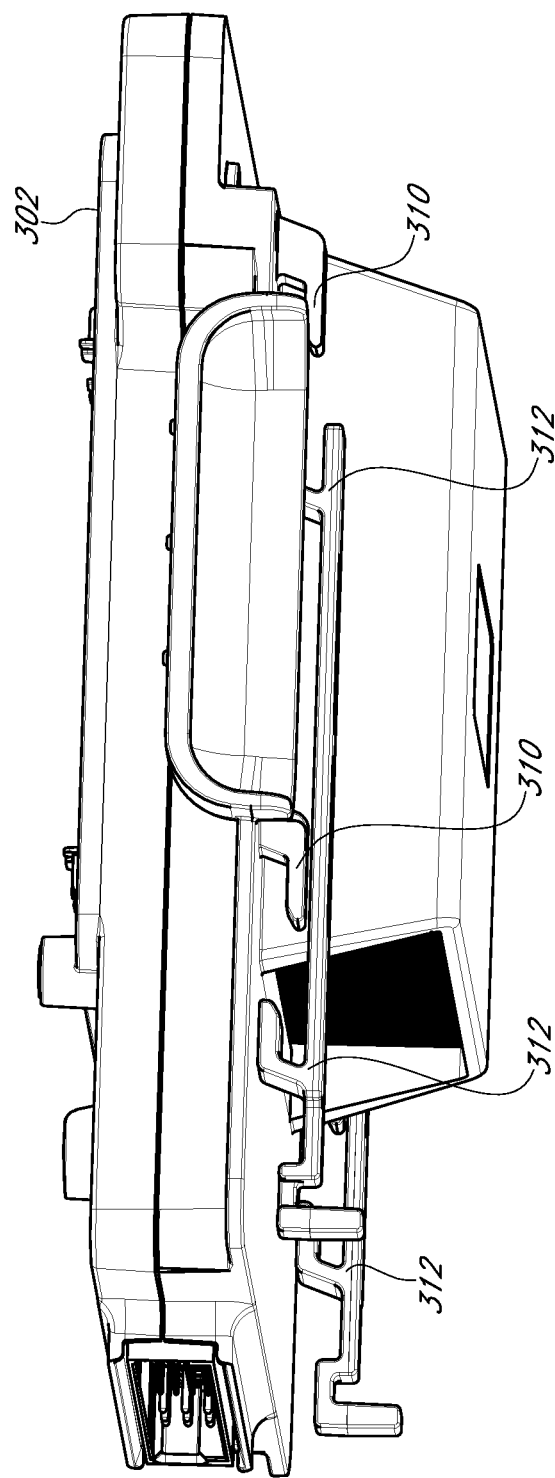

With additional reference to FIGS. 6A and 6B, sample block 302 may include at least one lock member 310, and the carrier, base, or tray 306 may include at least one corresponding lock member 312. The lock members 310, 312 are preferably configured to engage with each other to prevent removal from the carrier 306. Additionally or alternatively, lock members 310, 312 may be configured to register and/or align sample block 302 to carrier 306. In the illustrated embodiment, lock member 310 comprises a rail member 310a and a pair of two latch members 310b attached to or integral with rail member 310a. Alternatively, lock member 310 may comprises a single latch member 310b or three or more latch members 310b. In the illustrated embodiment, the lock member 312 comprises a rail member 312a and a pair of two latch members 312b attached to or integral with rail member 312a, wherein each latch member 312b is configured to slide over and/or interlock with a respective latch member 310b. Alternatively, lock member 312 may comprises a single latch member 312b or three or more latch members 312b. As seen in the illustrated embodiment, sample block 302 preferably comprises two lock members 310 located on opposites sides of the sample block 302, while carrier 306 comprises two corresponding lock members 312 located on opposites sides of carrier 306. In certain embodiments, sample block 302 comprises a single lock member 310 located on one side of the sample block 302, while carrier 306 comprises a corresponding lock members 312 located on same side of carrier 306. As discussed further herein, the lock members 310, 312 may be controlled by a controller to be in either a locked configuration, for example when sample holder 316 is being exchanged, or unlocked configuration, for example when the sample block 302 and/or a mating heated cover (e.g., cover 800) are being exchanged.

The sample holder 316 may additionally comprise a sample holder radio-frequency identification (RFID) tag 318 containing information or data regarding the sample holder 316, reagents, dyes, or other chemistry contained in or on the sample holder 316, history of sample holder use, assay parameters or instructions, and/or the like. In certain embodiments, the sample block 302 and/or sample holder 316 comprise a sensor 320 and/or 320' in communication with the sample holder RFID tag 318. Additionally or alternatively, the sensor 320' may be located on the thermal block 305.

As seen in FIG. 10B, in some embodiments, system 1000 may optionally include at least one reagent container 1030 comprising a reagent container RFID tag 1032. The content of the reagent container 1030 may added to at least some of the reaction sites 317 in preparation to conduct an assay.

FIG. 4A shows a cross-sectional view of the block assembly 300 of FIGS. 3A-3B in a closed position or configuration (e.g., withdrawn or engaged) according to an example embodiment. When the block assembly 300 is in the closed position, the sample block 302 and heated cover 800 are in position for performing an assay on the sample holder 316. FIG. 4B shows a cross-sectional view of the block assembly 300 in an open position or configuration (e.g., extended or disengaged). In certain embodiments, when the block assembly 300 is in the open position, the sample holder 316 may be exchanged for a different sample holder 316; however, the sample block 302 remains locked to the carrier 306 and the cover 800 is held by the cover carrier 710 and remains inside the housing 1001 of the system 1000. In an alternative embodiment, when the block assembly 300 is in the open position, the sample block 302 and the heated cover 800 are disengaged from their respective carriers and, therefore, the sample holder 316, the sample block 302, and the heated cover 800 are all available for exchange. In one embodiment, a driver, actuator, or drive mechanism 402, e.g., in the form of a stepper motor and worm gear, can operate to drive the movable base 308 and the carrier, base, or tray 306, and sample block 302 mounted thereon, to slide back and forth relative to the support structure 301 by one or more predetermined distances between the opened and closed positions. A controller may be used to automatically operate the drive mechanism. At least one sensor may be used to detect the position of the block assembly 300 to provide feedback to the drive mechanism 402. In the open position, the sample block 302 may be placed onto or removed from the carrier 306, thereby allowing one sample block to be replaced or exchanged for another sample block have a different construction and/or configured to accommodate a different type of sample holder while the system 1000 is still powered up (e.g., while power is still being supplied to the current sample block 302 and/or the heated cover 800). In the closed position, normal operations involving the sample block 302 may be carried out.

Figure 5A:
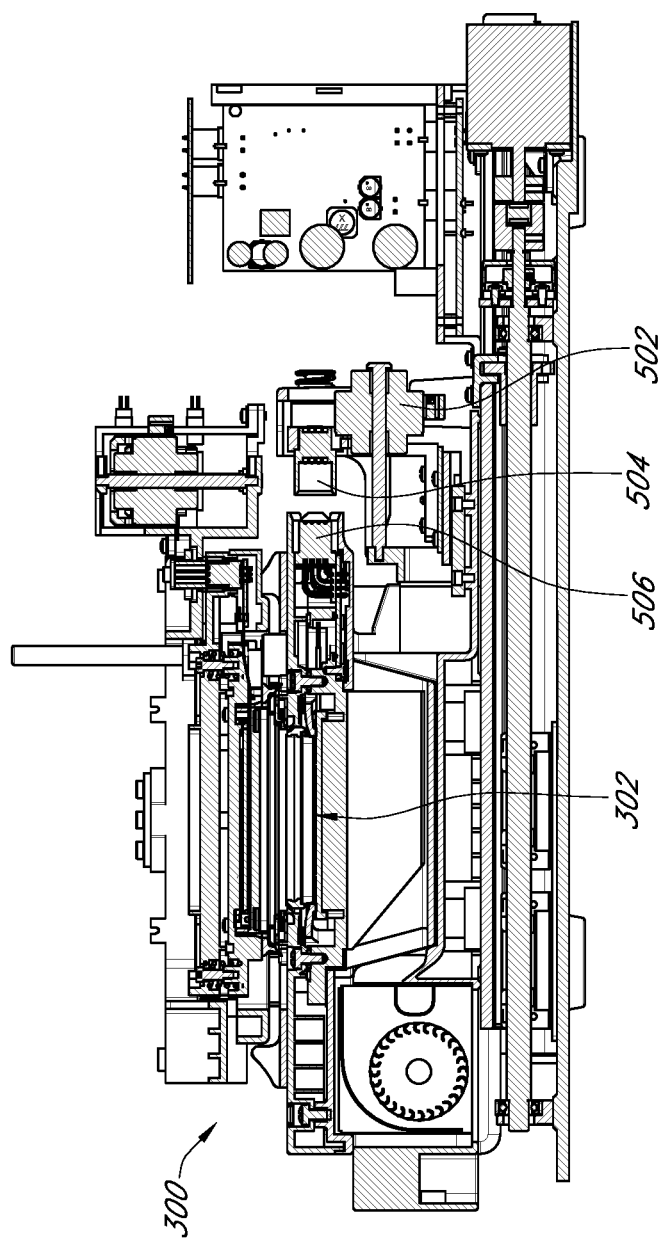
FIGS. 5A-5B show the sample block of the block assembly of FIGS. 3A-3B in disengaged and engaged states, respectively, with a base according to an example embodiment.
Figure 5B:
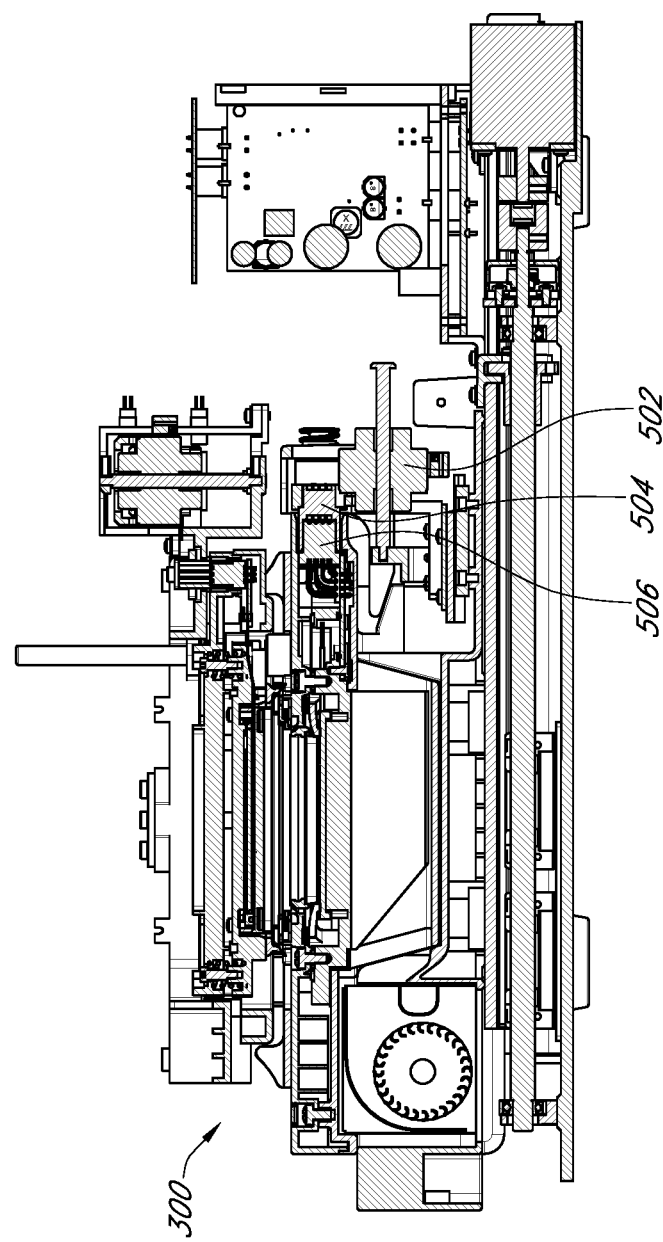

FIG. 5A shows a cross-sectional view of the block assembly 300 of FIGS. 3A-3B having the sample block 302 disengaged with the movable base 308 according to an example embodiment. FIG. 5B shows a cross-sectional view of the block assembly 300 having the sample block 302 engaged with the movable base 308. For example, a driver, actuator, or drive mechanism 502, e.g. in the form of a can-stack linear actuator, can drive a first connector member 504 (e.g. a female connector) linked to the movable base 308 back and forth horizontally to engage/disengage with a second connector member 506 linked to the sample block 302. When the first and second connector members 504, 506 engage with each other, movement of the sample block 302 relative to the movable base 308 is prevented or minimised.

To further positionally secure the sample block 302 relative to the base and prevent dislodgement of the sample block 302 during operation, additional locking features are provided in the example embodiments as described above with reference to FIGS. 3A-D and also shown in FIGS. 6A-B. In one implementation, as the drive mechanism 502 (see FIGS. 5A-5B) moves the first connector member 504 (see FIGS. 5A-5B) toward the second connector member 506 (see FIGS. 5A-5B), the lock members 310, 312 engage with each other. Together with the connector members 504, 506, the lock members 310, 312 help to secure the sample block 302 in position.

Figure 7:
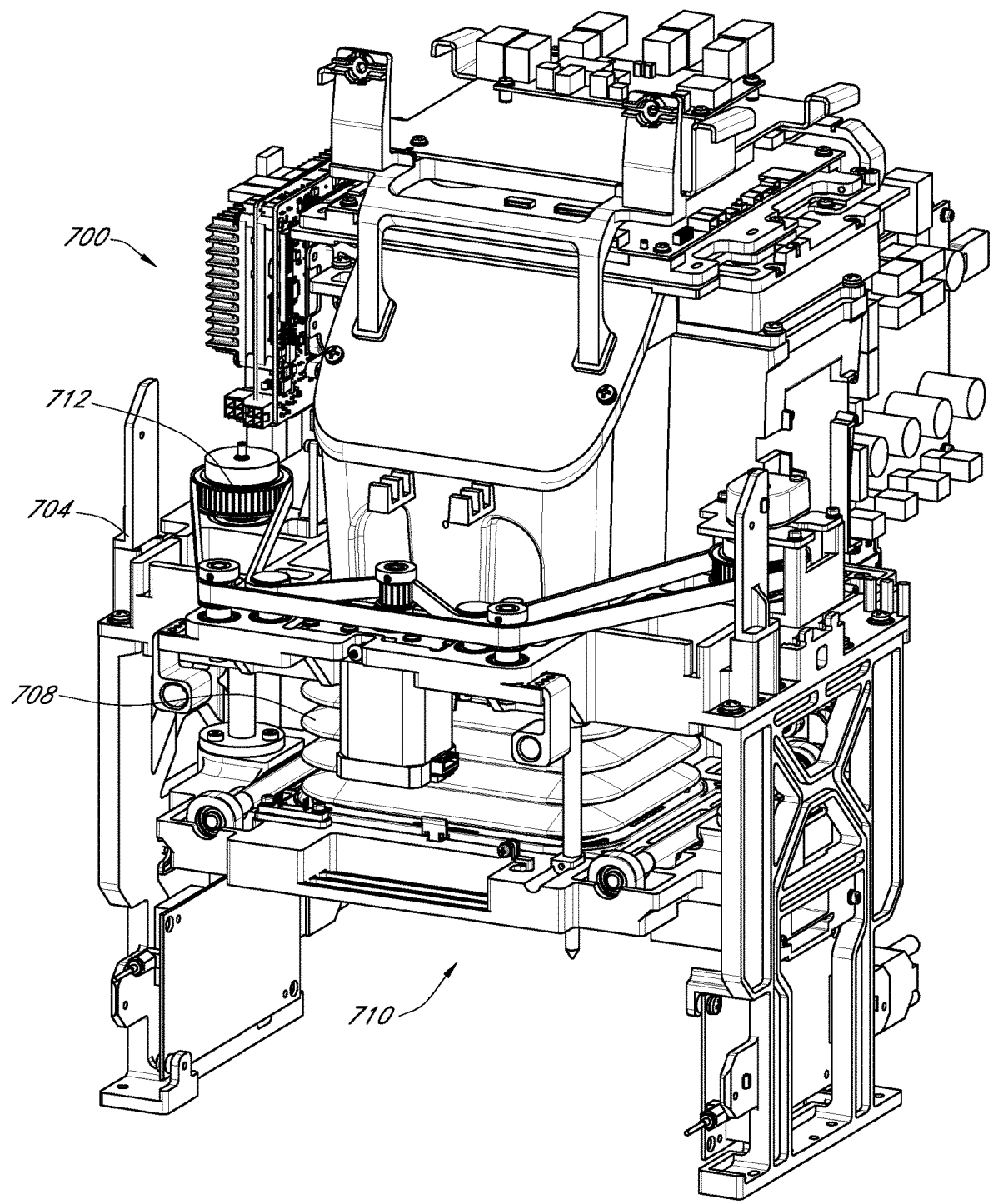
FIG. 7 shows a perspective view of an optics assembly having a cover carrier connected thereto according to an example embodiment.

FIG. 7 shows a perspective view of an optics module or assembly 700 and a cover carrier 710 according to an example embodiment. The cover carrier 710 and/or the optics assembly 700 may be attached to and/or supported by the frame 704. An extendable bellow 708 is disposed between the optics assembly 700 and the cover carrier 710. For example, the bellow 708 is connected to the optics assembly 700 at one end and to a cover carrier 710 at the other end. A driver, actuator, or drive mechanism 712 is configured to move the cover carrier 710 vertically up and down, as will be described in further details below with reference to FIGS. 8A-8D.

As the cover carrier 710 is lowered, the bellow 708 extends, and as the cover carrier 710 is raised, the bellow 708 collapses. Bellow 708 provides an enclosure between the top of the cover carrier 710 and the optics module 700 so that when the cover carrier is in the extended, lowered position, the bellow 708 provides optical isolation from stay light from outside sources that might otherwise introduce noise at the optical sensor during an assay. Advantageously, the bellow 708 facilitates the disclosed configuration which allows the heavier sample block 302 to be translated in a horizontal axis for placement or exchange of the sample holder and/or sample block, while the lighter heated cover may be translated in an orthogonal axis for engagement in preparation for and during a run or assay using the system 1000. As seen in FIG. 10A, the frame 704, including the optics assembly 700 and the cover carrier 710 may be attached or mounted to the support structure 301 used to hold and transport the thermal block assembly 300. This provides two separate, single-axis translation systems (one for transporting the thermal block assembly 300 and the other to place the cover 800 over the thermal block assembly 300). It has been found that this arrangement provides more accurate alignment of the cover 800 to the reaction sites 317 of sample holder 316 than a more complex system comprising a dual-axis arrangement.

Figure 8A:
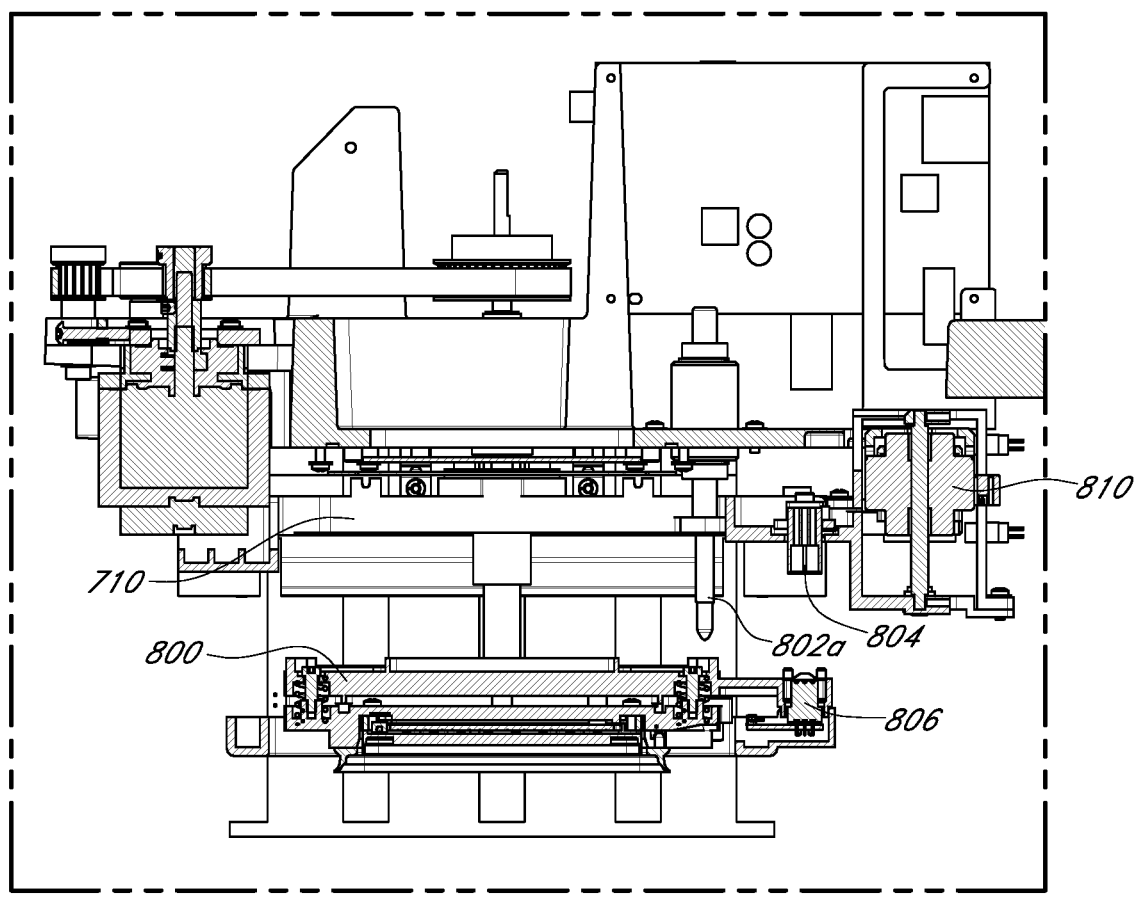
FIGS. 8A-8D show cross-sectional view illustrating an operation of the cover carrier according to an example embodiment.
Figure 8B:
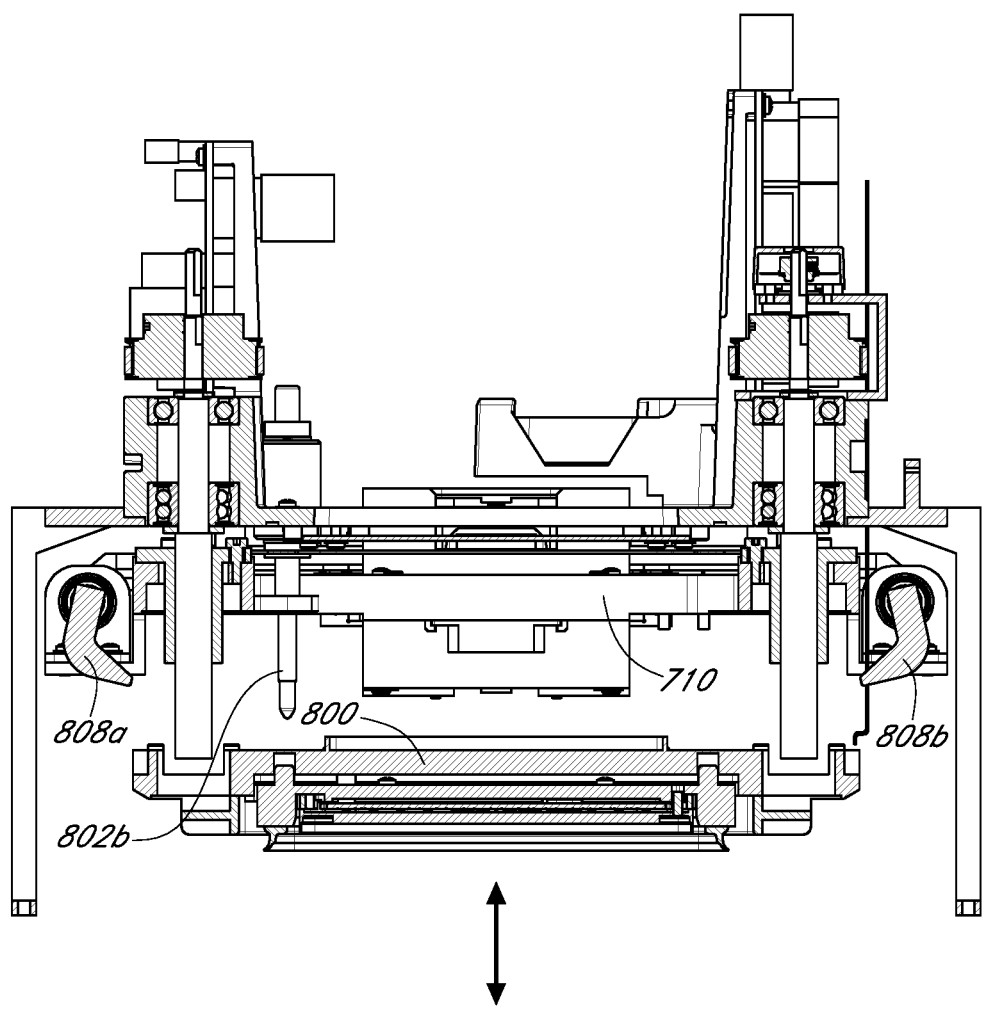

FIGS. 8A-8D show cross-sectional views illustrating an operation of the cover carrier 710 according to an example embodiment. FIGS. 8A-8B show alternative cross-sectional views as the cover carrier 710 is being lowered onto a heated cover 800 disposed on a block assembly (not shown), such as the block assembly 300 discussed above. In one implementation, the cover carrier 710 includes a plurality of alignment pins 802*a*, 802*b* (typically at least 2 such alignment pins are used) to align or approximately align the cover carrier 710 with the heated cover 800. In particular, the alignment pins 802*a*, 802*b* help to ensure alignment between a third connector member 804 on the cover carrier 710 with a fourth connector member 806 on the heated cover 800. Additionally or alternatively, alignment pins 802*a*, 802*b* are used to register or align a sample block 302 to the cover carrier 710. The certain embodiments, upper portions of align pins 802*a*, 802*b* are inserted into corresponding through-holes or cylinders of system 1000 to register or align the cover carrier 710 and the sample block 302 to the system 1000 (e.g., to the optical assembly 700). Connector members 804, 806 may include electrical contact to provide electrical communication and/or power to heated cover 800. The cover carrier 710 also includes a gripper mechanism which includes gripper arms 808*a*, 808*b* driven by a driver, actuator, or drive mechanism 810. As the cover carrier 710 moves down towards the heated cover 800, the gripper arms 808*a*, 808*b* are opened. As seen in FIG. 9B, there are two gripper arms 808*a* and two gripper arms 808*b* in the illustrated embodiment. In other embodiments there may be one, three, or more gripper arms 808*a*, 808*b*.

Figure 8C:
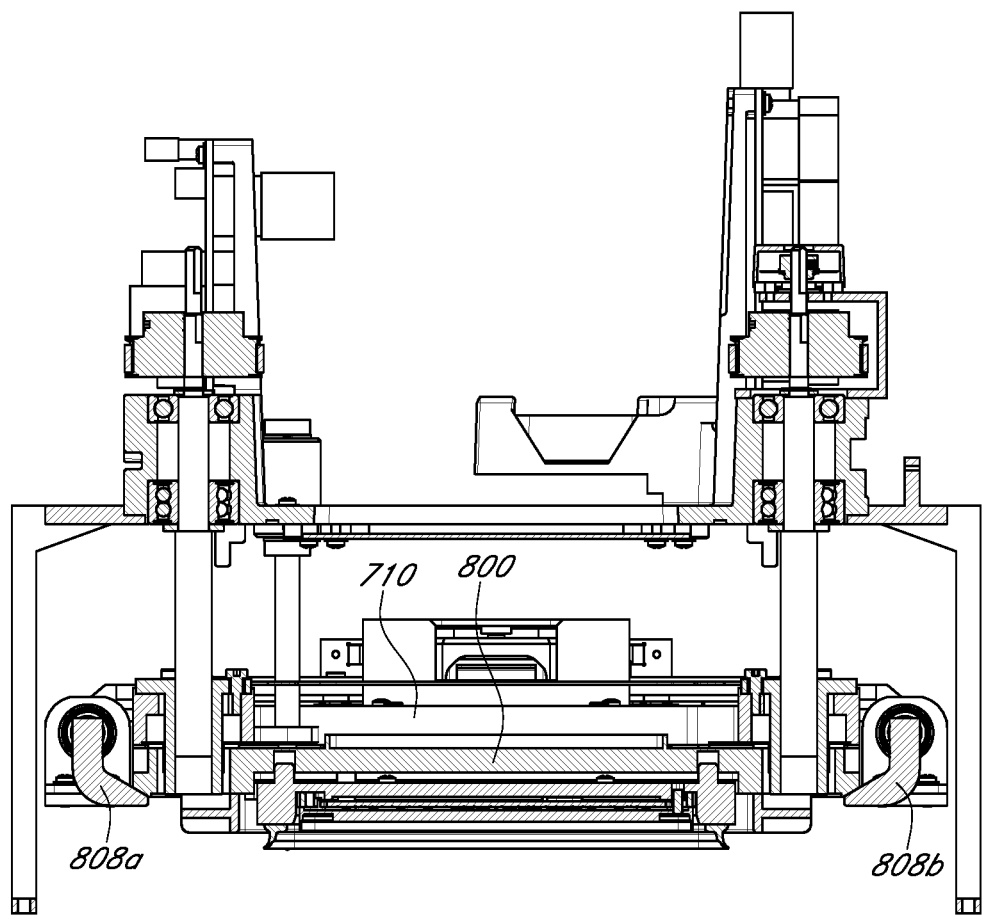
Figure 8D:
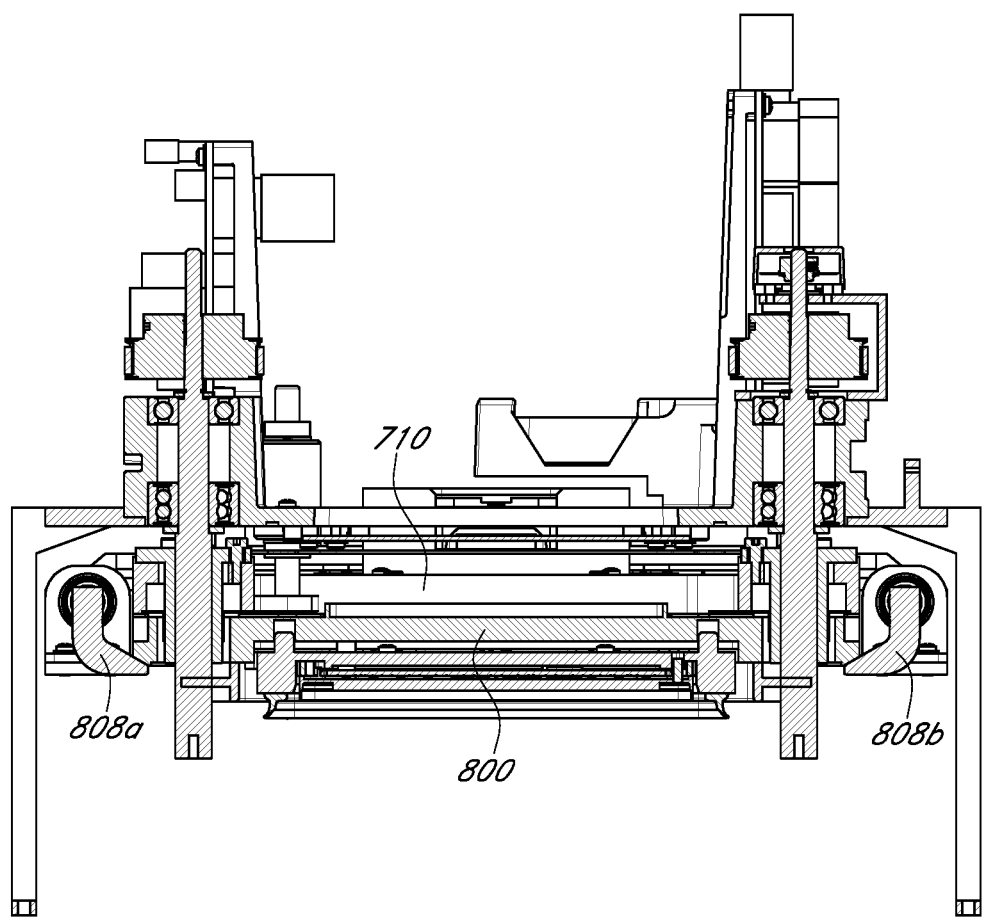

FIG. 8C shows a cross-sectional view as the cover carrier 710 is in contact with the heated cover 800. At this point, the third connector member 806 engages with the fourth connector member 808 (not shown in FIG. 8C). Further, the gripper arms 808*a*, 808*b* are actuated to close and generate an active clamping force onto the heated cover 800 to securely grip the heated cover 800. Accordingly, the heated cover 800 is fully engaged with the cover carrier 710 by way of both the connector members 804, 806 and the gripper arms 808*a*, 808*b*. From this state, the drive mechanism 712 can move both the cover carrier 710 and the engaged heated cover 800 upward to a raised position as shown in FIG. 8D.

Figure 9A:
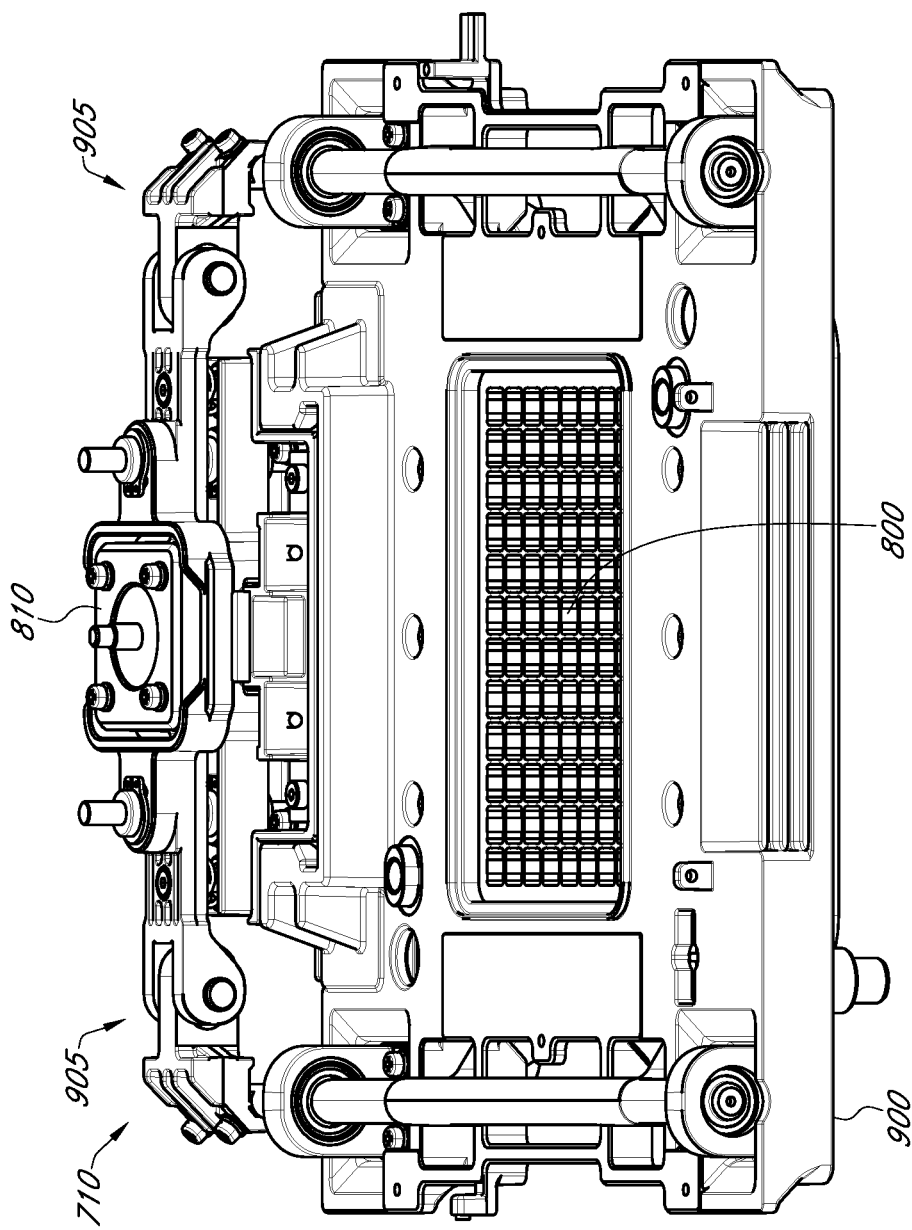
Figure 9C:
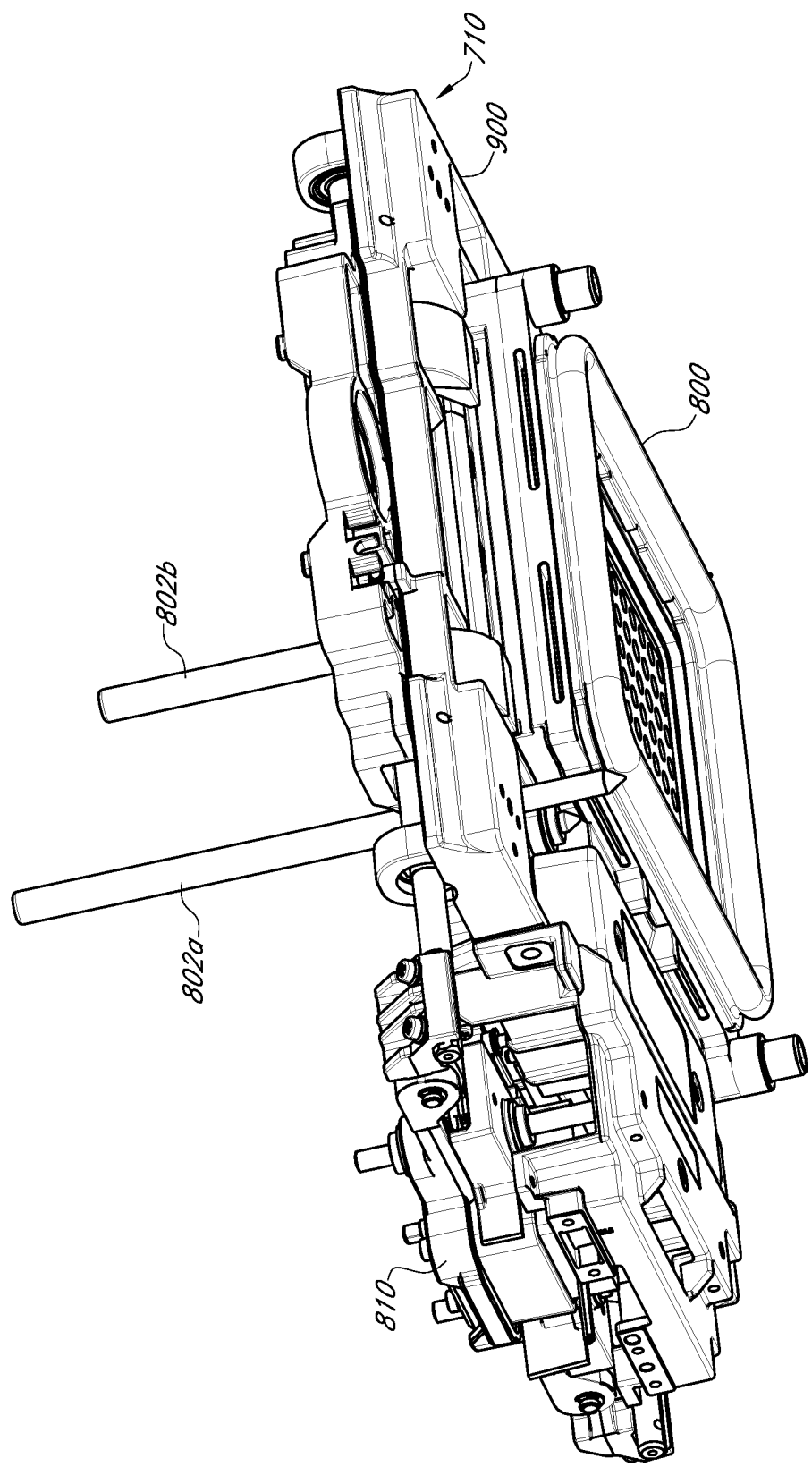
Figure 9D:
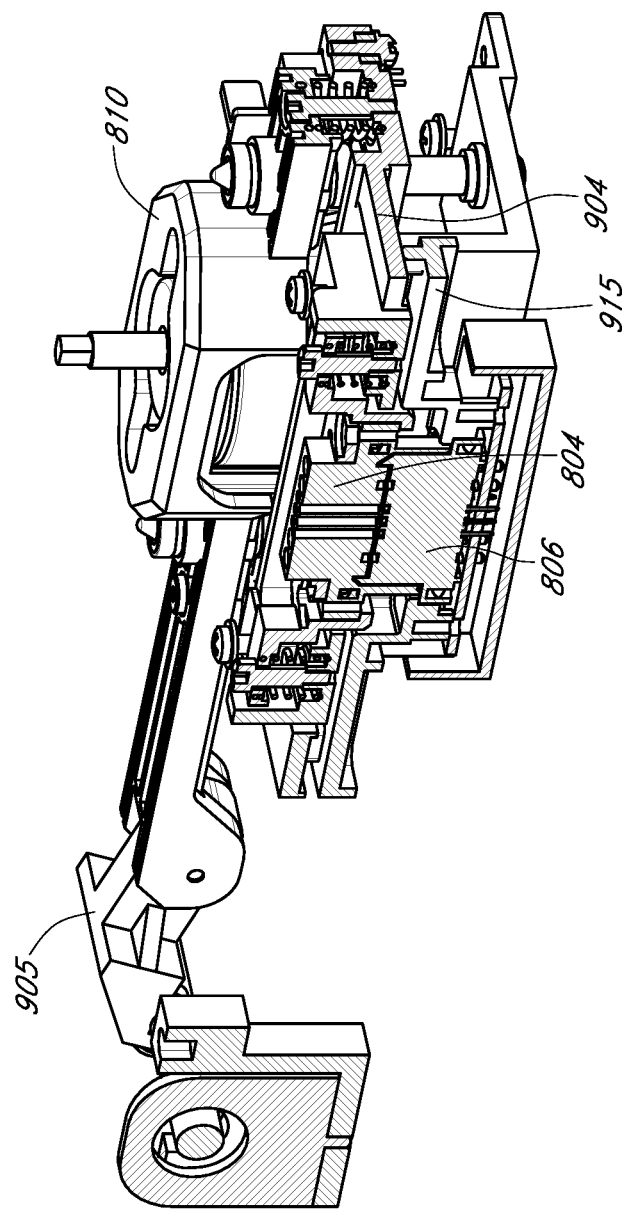

FIGS. 9A-9K show various views of the cover carrier 710, drive mechanism 810, and gripper arms 804, 806. Referring to FIGS. 9A-9C, the cover carrier 710 comprise a carrier plate 900 that mates with a top surface of the heated cover 800 and the drive mechanism 810, which is configured to rotate gripper arms 808 through a linkage 905. FIG. 9A shows a partial cross-sectional view of the drive mechanism 810 according to an example embodiment. The drive mechanism 810 can control movement of the gripper arms 808*a*, 808*b* via respective linkages, with linkage 905 being shown in FIG. 9. In addition, the drive mechanism can actuate an ejection bar 910 to exert a downward force onto and a corresponding part 915. The part 915 is connected to the fourth connector member 806. Accordingly, the drive mechanism 810 can disengage the third and fourth connector members 804, 806 while opening the gripper arms 808*a*, 808*b* to thereby disengage the heated cover 800 from the cover carrier 710. In certain embodiments, the carrier plate 900 comprises the ejector bar 910, which may be coupled to the carrier plate 900 (e.g., using an adhesive, bolt, fastener, or the like) or be part of a unitary structure with the carrier place 900. Additionally or alternatively, the third and fourth connector members 804, 806 may be disengaged by using the driver mechanism 712, for example, by separating the cover carrier 710 from the heated cover 800, which may be accomplished by lifting the cover carrier 710 away from the heated cover 800.

Figure 9E:
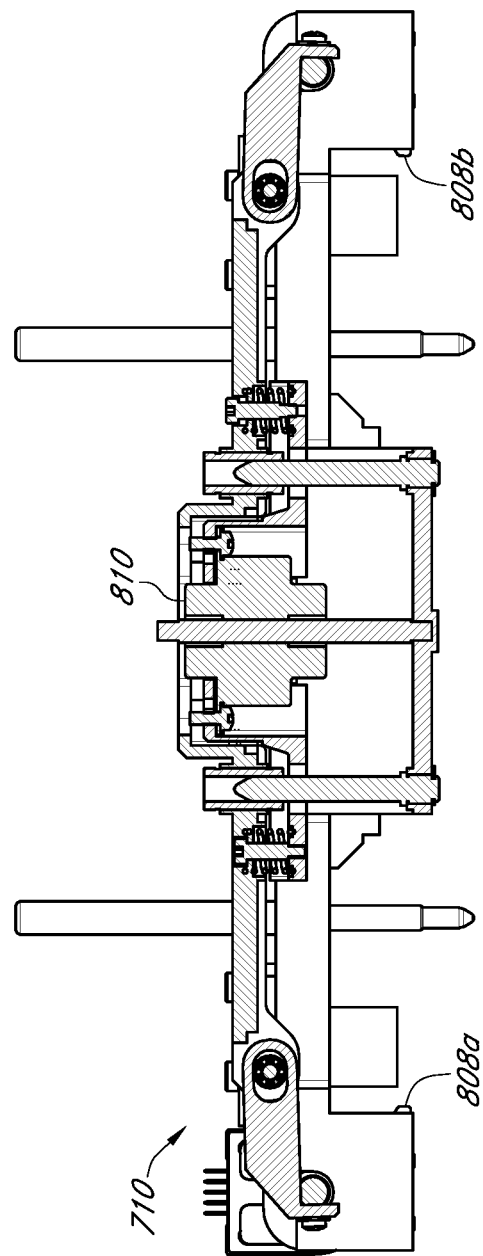
Figure 9F:
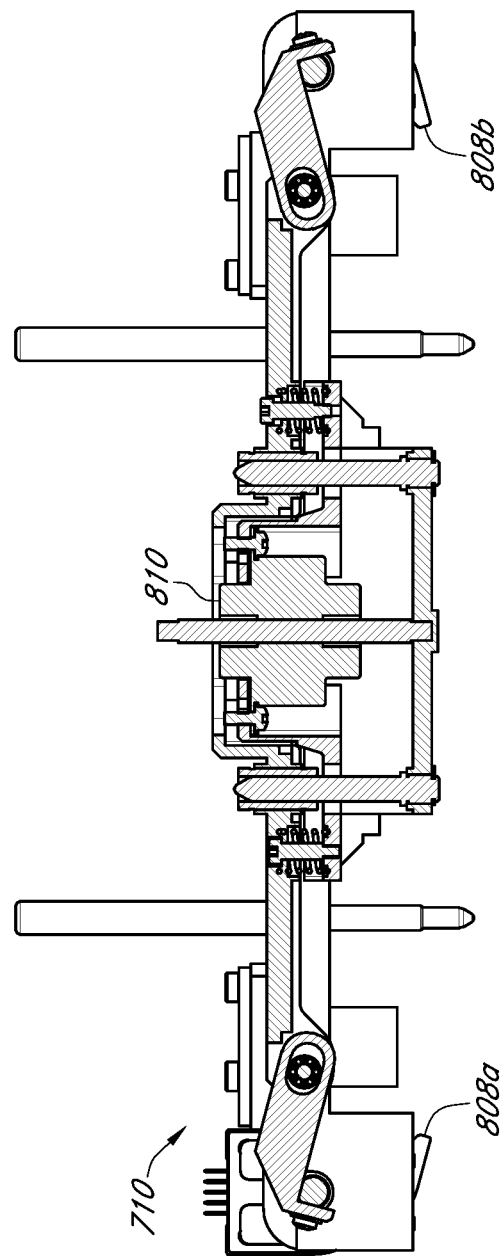
Figure 9G:
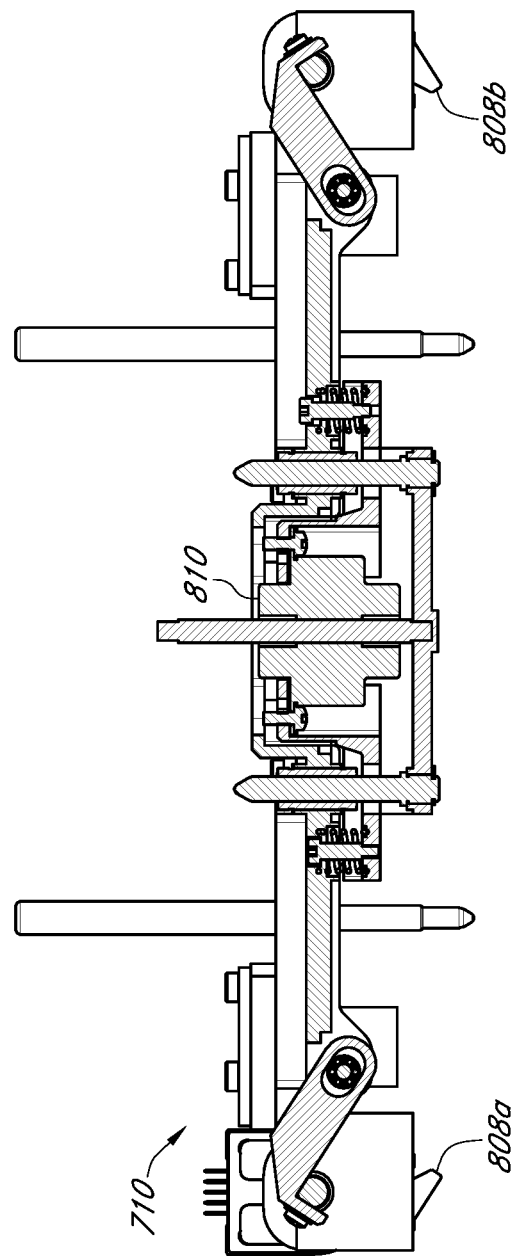

FIGS. 9E-9H illustrate a preferred embodiment of operation of the drive mechanism 810. The mating heated cover 800 is not shown for simplicity. FIG. 9E shows a first configuration of the drive mechanism 810 and cover carrier 710 in which the gripper arms 808*a*, 808*b* are in a closed position suitable for holding the heated cover 800, for example, during an assay or biological test. FIG. 9F show a second configuration of the drive mechanism 810 and cover carrier 710 in which the drive mechanism 810 is lower relative to the axis of rotation of the gripper arms 808*a*, 808*b*. As a result of this relative motion, the gripper arms 808*a*, 808*b* are now in an open position suitable for release of the heated cover 800, for example, in preparation for exchanging the heated cover 800 and/or the sample block 302 for a different heated cover 800 and/or the sample block 302 (e.g., exchanging the 96 well format heated cover 800 and the sample block 302 for a 384 well or 384 array card format heated cover 800 and the sample block 302). FIG. 9G show a third configuration of the drive mechanism 810 and cover carrier 710 in which the drive mechanism 810 is lowered even further relative to the axis of rotation of the gripper arms 808*a*, 808*b*. As a result of this relative motion, the gripper arms 808*a*, 808*b* may now extended beyond the open position in the second configuration. The movement between the second configuration and the third configuration the actuation of the ejection bar 910 to exert a downward force so as to disengage the third and fourth connector members 804, 806, as described above.

Figure 9H:
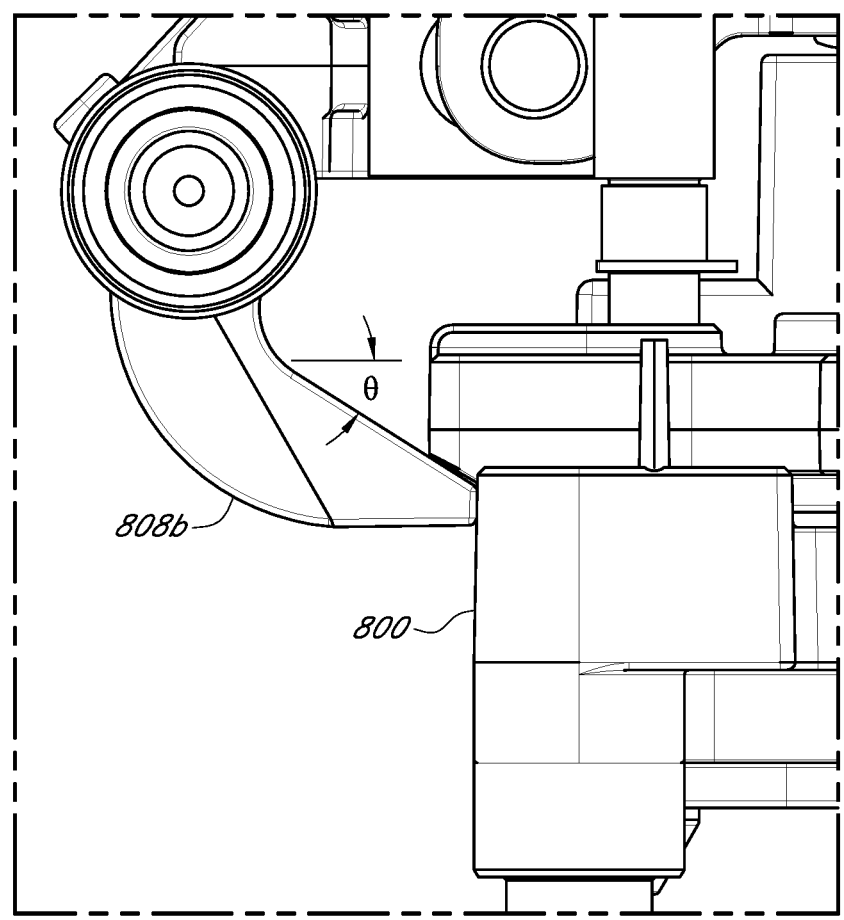

With further reference to FIG. 9H, it has been discovered that by proper design of the interface between heated cover 800 and the gripper arms 808, the heated cover 800 can be more accurately aligned to the optical assembly 700. For example, it has been found that a sloped interface angle, $\theta$, may be selected to provide a desirable lateral accuracy or repeatability in the location in X and Y axes of a plane parallel to the upper surface 303. That is, the sample block 302 may be removed from the system 1000, then later be placed back into the system 1000, with an accuracy or repeatability that is within a predetermined range. For example, in a preferred embodiment, it has been found that sloped interface angle, $\theta$, from 30 degrees to 50 degrees provides a lateral accuracy or repeatability that is less than or equal to 200 micrometers. For an optical system with a 20× demagnification, this is equivalent to an accuracy or repeatability at the imaging sensor of 10 micrometers. In another preferred embodiment, it has been found that sloped interface angle, $\theta$, from 30 degrees to 50 degrees provides a lateral accuracy or repeatability that is less than or equal to 100 micrometers.

Figure 9J:
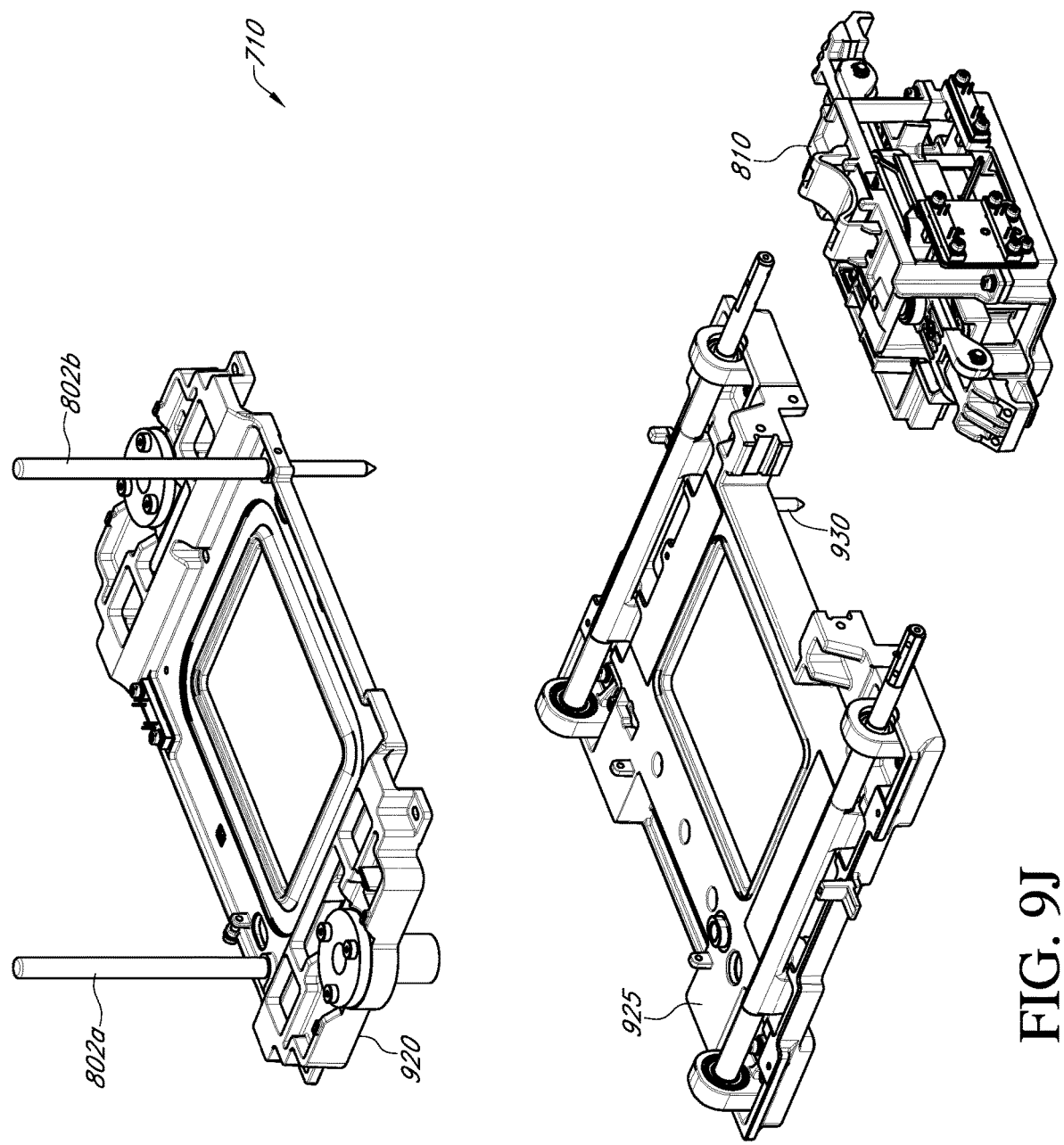
Figure 9K:
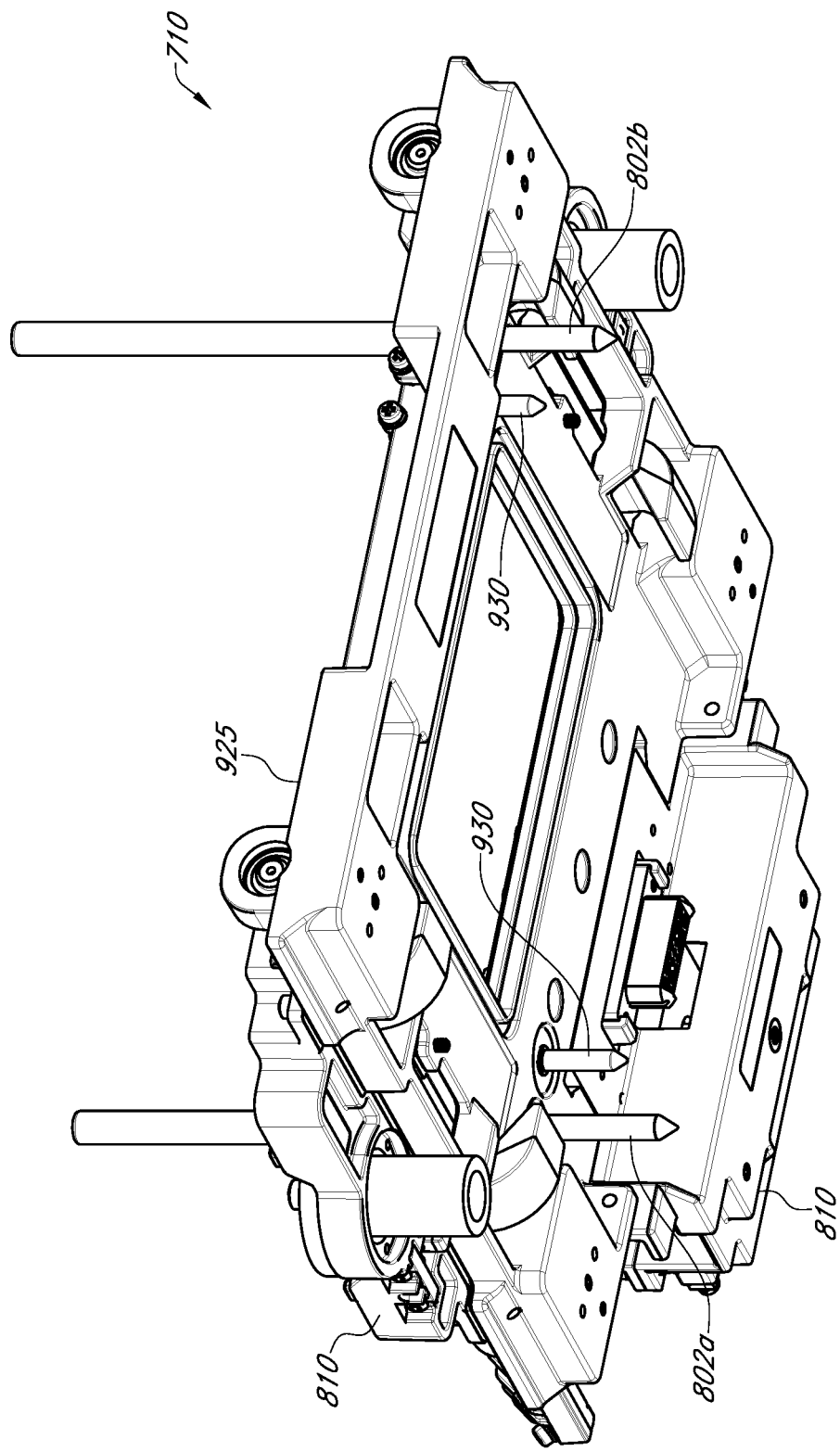

With further reference to FIGS. 9J-K, it has been discovered that initial alignment of cover carrier 710 to the optical assembly 700 and to the block assembly 300 is critical. For example, in certain embodiments, the cover 800 includes a lenslet array that focuses excitation light or electromagnetic radiation from an excitation source into each reaction site 317 of a sample holder 316. The lateral positioning of the lenslet array in two axes in a horizontal plane determine where the focus of each lenslet is positioned within a corresponding reaction region 317. To facilitate initial alignment of the lenslet array to the block assembly 300 and/or sample blocks 300, the cover carrier 710 may comprise an upper plate or assembly 920 and a lower plate or assembly 925. During installation and/or alignment of cover carrier 710 into the system 1000, the upper plate 920 may be mounted or fixed to a frame of system 1000 (e.g., to the optical assembly 700). The lower plate 925, to which the heated cover 800 is mounted or engage with during use, is moveably mounted or attached to upper plate 920. The lower plate 925 may then be moved in a horizontal direction in one or two axes, for example while a heated cover 800 or a substitute thereof, to position the lower plate to a location such that light or radiation from the excitation source is properly located within the wells or reaction sites 317 of a sample holder 316. Once the lenslet array of the heated cover 800 is aligned to the wells or reaction sites 317, the lower plate may be locked or fixed to the upper plate.

In certain embodiments, lower plate 925 comprises at least two alignment pins 930, which are used to register or align a heated cover 800 to the lower plate. As discussed above, upper portions of align pins 802a, 802b are inserted into corresponding through-holes or cylinders of system 1000 to register or align the cover carrier 710 (more specifically the upper plate 920) to the system 1000 (e.g., to the optical assembly 700). Additionally or alternatively, alignment pins 802a, 802b are used to register or align a sample block 302 upper plate 920 and, as a consequence, to the system 1000. Lower plate 925 are used to adjust the alignment lenslet array of the heated cover 800 to the wells or reaction regions of a sample block 302, as discussed above. In this way, the pins 802a, 802b are used to approximately align the lenslet array to the wells or reaction regions of the sample block 302 and the adjustable lower plate is used to provide a more accurate or precise alignment of the lenslet array to the wells or reaction regions of the sample block 302.

The system according to the present teachings can perform automated operations to install and replace/remove the sample block 302 and heated cover 800 as necessary. Some examples are now described with reference to FIGS. 3-9.

In one example to install the sample block 302 and heated cover 800, the block assembly 300 is initially at the open position when a user initiates the installation sequence. Depending on the configuration, the heated cover 800 may already be placed onto the sample block 302 beforehand, or they can be put together in situ. Alignment features can help to position the heated cover 800 correctly relative to the sample block 302. One or more sensors may also be used to determine the presence and/or orientation of the heated cover 800 on top of the sample block 302. The sample block 302 together with the heated cover 800 thereon is then placed into the carrier, base, or tray 306 of the block assembly 300.

It will be appreciated that the above steps can be performed by a human operator, or alternatively, by an articulated arm. In the latter case, the articulated arm may be remotely controlled by a human operator or may be programmed to perform the tasks autonomously.

Once the system can confirm the presence of the sample block 302 and heated cover 800, the remaining steps of the installation sequence can be carried out automatically. For example, the drive mechanism 402 (see FIG. 4A) draws the block assembly 300 to the closed position. There, the drive mechanism 712 (see FIG. 7) moves the cover carrier 710 (see FIG. 7) down to engage with the heated cover 800. As the gripper arms 808a, 808b close onto the heated cover 800 and the cover carrier 710 exerts a clamping force onto the heated cover 800 which is mounted on the sample block 302, the sample block 302 is effectively immobilised at this time.

While the sample block 302 is held in position, the drive mechanism 502 (see FIG. 5A) moves the first connector member 504 to engage with the second connector member 506. The same movement causes the lock members 310, 312 to engage with each other. As a result, the sample block 302 is secured to the movable base 308.

After the engagement is completed, the drive mechanism 712 moves the cover carrier 710 in engagement with heated cover 800 to a raised position, ready for deployment. For example, the operator may start a PCR experiment, and the block assembly 300 may be extended to the open position for loading a sample holder and then drawn to the closed position, before the cover carrier 710 is lowered to begin thermal cycling.

In another example to remove the sample block 302 and heated cover 800, the block assembly 300 may is initially at the closed position and the heated cover 800 is at the raised position when the operator initiates the removal sequence. The system can automatically operate the drive mechanism 712 to lower the heated cover 800 onto the sample block 302. Once the heated cover 800 is detected to be on top of the sample block 302, the gripper arms 808a, 808b open to release the heated cover 800. In addition, the drive mechanism 810 (see FIG. 8) causes the ejection bar 910 to exert a downward force to disengage the third and fourth connector members 804, 806 from each other. The cover carrier 710, after being separated from the heated cover 800, can be drawn to the raised position.

Separately, the drive mechanism 502 automatically causes the first and second connector members 504, 506 to disengage from each other, and lock members 310, 312 to dislodge from each other. Accordingly, the sample block 302, having the heated cover 800 on top, is disengaged from the movable base 308, and the drive mechanism 402 can move the sample block 302 to the open position where both the sample block 302 and heated cover 800 can be retrieved/removed, for example, by a human operator or an articulated arm.

As seen in FIG. 3A system 1000 may also include electronic components 314, which may include or be part of one or more controllers configured to control movement and/or engagement of the various components of system 1000. For example, at least some of the electronics components 314 may be configured, alone or in conjunction with electronics of systems outside housing 1001 in communication with system 1000, to control the motion or engagement of any or all of sample block 302, the carrier 306, moveable base 308, connector members 504 and/or 506, cover 800, connectors 804 and/or 806, lock members 310 and/or 312, gripper arms 808a, b, cover carrier 710, bellows 708. For example, at least some of the electronics components 314 may be configured, alone or in conjunction with electronics of systems outside housing 1001 in communication with system 1000, to control the motion of the sample block 302 and/or movable base 308 relative to support structure 301, as illustrated in FIGS. 4A and 4B. Additionally or alternatively, electronic components 314 may be configured to move cover 800 and/or cover carrier 710 relative to sample holder 316 and/or sample block 302. In certain embodiments, electronic components 314 may be configured to operate lock members 312 to engage lock members 310 of the sample block 302, for example, to secure or lock the sample block 302 to the moveable base 308 or carrier 306. In certain embodiments, electronic components 314 may be configured to secure or lock cover 800 to cover carrier 710, for example, using gripper arms 808a and/or 808b, wherein the cover carrier 710 may be used to lift cover 800 off of the sample block 302 before moving the sample block outside housing 1001 to exchange or adjust the sample holder 316. Alternatively, the electronic components 314 may be configured to disengage System Integration In addition to the block assembly 300, optics assembly 700 and cover carrier 710 as described above, the system 1000 also includes a back chassis assembly 1002 which can provide electrical and thermal management for the system 1000. As illustrated in FIGS. 10A and 10B, the housing 1001 may enclose any or all of block assembly 300, optics assembly 700, cover carrier 710, and/or back chassis assembly 1002. Housing 1001 may formed by various member that are attached to one another, for example members 1004, 1006, 1008, 1010 together with front housing 1012 shown in FIG. 10B.

The front housing 1012 also include a drawer face 1014 and a door face 1015 disposed above the drawer face. During operation, the drawer face moves forward when the block assembly moves from the closed position to the open position. If only a sample holder 316 is to be inserted or exchanged, the door face 1015 remains stationary. If the sample block 302 and/or the heated cover 800 are being exchanged, the drawer face 1014 moves forward and the door face 1015 is flipped open from the top to allow passage of the heated cover 800. Alternatively, the door face 1015 may be raised up and/or retracted into the system 1000 during this operation to allow passage of the heated cover 800. As a safety or precautionary feature, the door face 1015 may be configured to move to an open position (e.g., flipped or raised) during start up of the system 1000. This preclude possible damage to the system 1000 if, for example, the block assembly 300 was in an open position during the most recent power down (either intentionally or accidentally, for example due to a power failure). In this case, no damage to the door face 1015 would occur during retraction of the block assembly 300 back into the housing 1001 to a closed position during or after start up of the system, since the door face 1015 would be opened or retracted.

The front housing 1012 includes several input/output features. A display screen 1016 capable of receiving touch input is mounted on the front housing 1012. In one implementation, the front housing 1012 comprises an image system 1017 comprising one or more cameras that may be configured to detect or identify the face of a perspective user of the system 1000. The image system 1017 may be configured to provide or produce one or more outputs if one or more predetermined criteria are met, for example, if the face of the perspective user matches that stored data of individuals authorized of use the system 1000 and/or have access to certain capabilities of the instrument or information stored in the system 1000 or in a database to which the system 1000 has access. In certain embodiments, the image system 1017 may comprise a 3-dimensional (3D) camera module 1017. The 3D camera module 1017 is capable of detecting facial expressions and body gestures, and may be equipped with facial recognition software to automatically recognise a face of a registered user. Additionally or alternatively, the image system 1017 may be located at other locations, such as in or one a top or side panel of the system 1000.

Alternatively or in addition, the system 1000 may comprise voice system 1018 comprising one or more microphones 1018, for example, mounted on the front housing 1012. The voice system 1018 may be equipped with voice recognition software to automatically recognise voice instructions from a registered user.

The system 1000 and/or the front housing 1012 may also have a proximity sensor 1020 to detect an object or individual, e.g. a user, at a predetermined distance to turn on the 3D camera module 1017 and activate the microphones 1018. The proximity sensor may by any of the proximity sensors, probe, or device known in the art. Accordingly, in some example embodiments, it is possible to operate the system 100 in hand-free mode, e.g. by a voice command or body gesture. In certain embodiments, an output from the proximity sensor 1012 may be used enable the imaging system 1017 and/or the voice system 1018. The proximity sensor 1012 may be utilized in an environment in which two or more instruments 1000 are located in the same in a laboratory or room. Additionally or alternatively, the output from the proximity sensor 1020 may be used to determine whether output from the imaging system 1017 and/or the voice system 1018 will be utilized for starting, powering up, or activating the system 1000 and/or allow access to certain capabilities of the instrument or information stored in the system 1000 or in a database to which the system 1000 has access.

In this manner, it may be determined which system 1000 a user having access to the two or more instruments 1000 is to respond to a voice command or a face recognition signal. For example, if the user provides a voice command to activate or start one of the instruments 1000, or to implement some function of the system 1000, only the system 1000 to which the user is in closest proximity will respond. In certain embodiments, several authorized uses may be in the same laboratory or room, and each system 1000 will respond to each user in accordance to their proximity to a respective one of the instruments. It is anticipated that such capabilities may be utilized in other types of biological analysis instruments or non-biological analysis instruments having capabilities and features different from those disclosed herein, but having a proximity sensor 1020 according to the embodiments discussed herein used in the manner just described.

A pair of speakers 1022 may also be mounted to the front housing 1012 to provide audio updates, warnings, etc. such that a human operator does not need to regularly look at the display screen 1016.

The system 1000 may also include several features to further enhance performance. With reference to FIGS. 3C, 3D and 6A, the block assembly 300 further includes at least one ejector member 600 configured to at least partially raise the sample holder 316 away from the sample block 302 when in the open position. This can prevent the sample holder from sticking to the sample block 302 (as is the case in some existing systems) and facilitate removal of the sample holder from the sample block 302 after an experiment, especially when the removal is performed by an articulated arm (i.e. a robot). The inventors discovered that manual and/or robotic removal of sample holder 316 is better facilitated when ejector members 600 are located along the long side for the sample holder 316 corresponding to the L dimension in FIG. 3, rather than on the short side corresponding to the S dimension. For example, after a PCR assay using the system 1000, the edges of the sample holder 316 bow downward toward the center. It has been discovered that the depth of the bowing is greater on the long side that the short side of the sample holder 316. By placing the ejector members 600 along the long side corresponding to the L dimension in FIG. 3C, the clearance between the edge of the sample holder 316 and the surface 303 of the sample block 302 is greater than when the ejector members 600 are place on the short side corresponding to the S dimension in FIG. 3C. This may be accounted since the depth of the bowing is less along the short side of the sample holder 316 and may also be account for in that the greater bowing on the long side will tend to project the sample holder 316 further away from the surface 303.

Figures 11A, 11B:
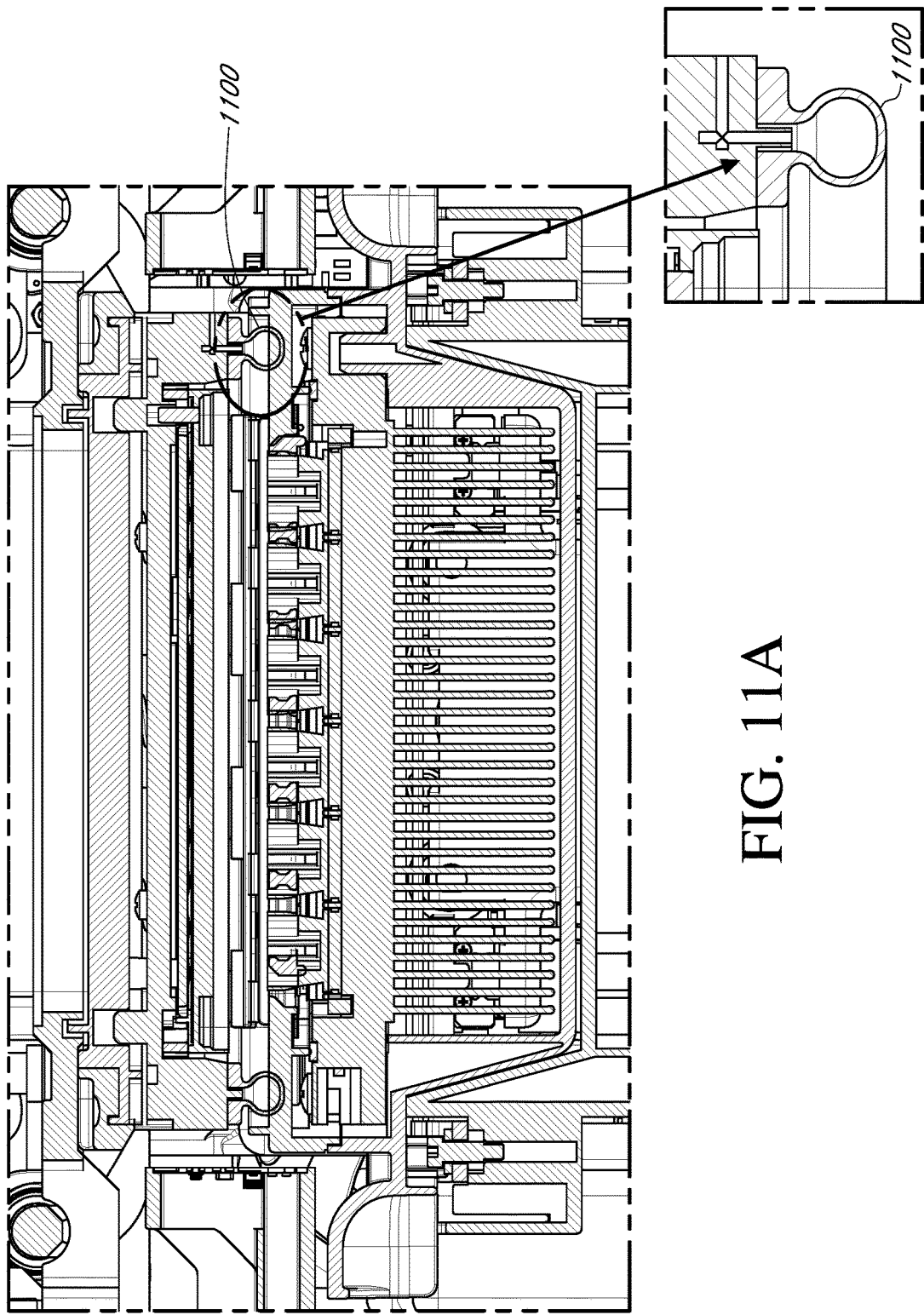
FIG. 11A-11B show close-up cross-sectional views inside the assembled system of FIGS. 10A-10B according to an example embodiment.

FIG. 11A shows a cross-sectional view illustrating an improved seal in the form of a double lip seal 1100 attached to a lower surface of the heated cover 800. FIG. 11B shows a magnified view of the seal 1100. The double lip design of the seal 1100 can avoid flaring issues, and corresponding poor sealing issues, occurring existing system using prior art single edge or single blade seals. These prior art single blade designs have been found to induce higher pressure in the four corners of the seal during compression when heated cover 800 in down position. As a consequence, sealing degrades over time and repeated use. The disclosed the double lip seal 1100 is configured to provide even contact with the surface 303 of sample block 302, thereby reducing or minimizing heat loss/interference to or from the external environment. In addition to providing a superior sealing at the surface 303, the bellows formed by the double lip seal also provides additional insulating properties of the seal itself, since the air between the inner and outer walls of the seal provided additional insulation.

The system 1000 according to the present teachings is also capable of both detecting a presence of a sample holder on the sample block 302, and reading relevant information about the sample holder. For example, as the cover carrier 710 is lowered together with the heated cover 800 onto the sample block 302 before an experiment run, the actual height of the heated cover 800 is monitored via feedback from one or more encoders. The height of the heated cover 800 is greater when the sample holder is present than when the sample holder is absence, due to the thickness of the sample holder. Accordingly, the presence or absence of the sample holder can then be determined. In certain embodiments, one or more such encoders may be used to distinguish between different types and/or brands of sample holder has been located within the sample block 302 based on differences in thickness between different types or brands. Similarly, the encoder(s) may be used to determine whether a correct or preferred sample holder has been located within the sample block 302.

Figure 12:
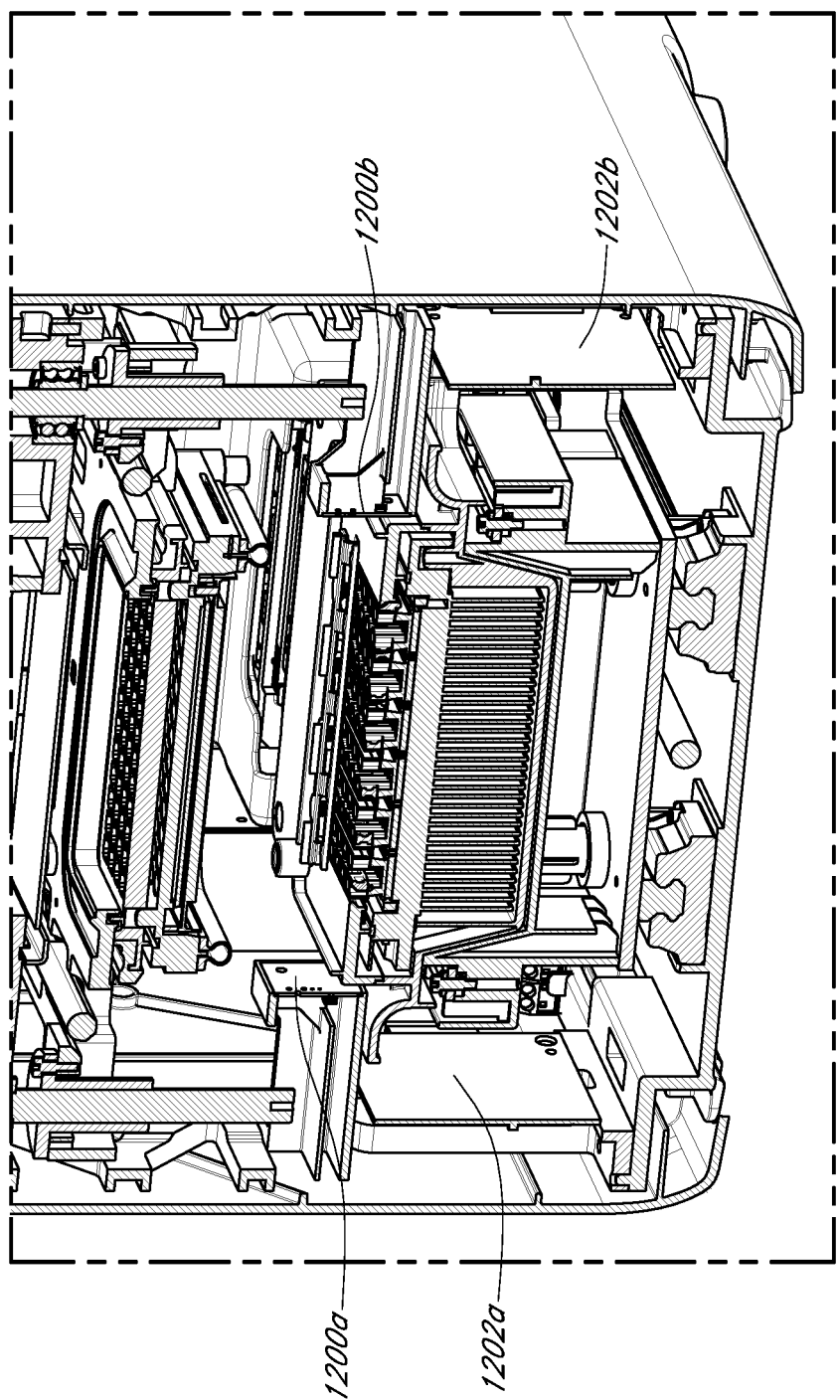
FIG. 12 shows a partial cross-sectional view of the assembled system of FIGS. 10A-10B according to an example embodiment.

Referring to FIGS. 3C, 3D, and 12, the system 1000 may include first and second RFID antennas 1200a, 1200b in communication with respective first and second devices 1202a, 1202b. The devices 1202a, 1202b may be an RFID reader, RFID writer, or combination RFID reader/writer. In certain embodiments, devices 1202a, 1202b may be combined into a single device that communicates with both antennas 1200a, 1200b. Devices 1202a, 1202b, alone or in combination with system 1000 and/or another system in communication with system 1000, may be configured to read RFID tag 318. The RFID tag 318 and the data contained therein may be used to confirm presence of the RFID, confirm the correct sample holder is being used, perform a pre-run check prior to performance of an assay using system 1000, control the system 1000 and/or assays run on system 1000 (e.g., by providing information about sample holder 316 and/or reaction sites 317 to generate a protocol for use by system 1000 to run an assay, experiment, or test on sample holder 316). In some embodiments, devices 1202a and/or 1202b may be configured to write data generated during an assay conducted on the system 1000. Additionally, data recorded on RFID tag 318 during the assay and/or data already contained on the RFID tag prior to placement in the system 1000 may be used to process the data produced during the assay.

After the run, the RFID writers/readers 1202a, 1202b can write information onto the sample holder RFID tag to mark the sample holder as used which can prevent the sample holder from being re-run. The information can also be transmitted to a remote location, e.g. for inventory control and procurement purposes. The 2 readers also allow detection of the orientation of the sample holder. If a user place does not place the sample holder in normal orientation, system software can account for the angular offset for display and analysis.

Figure 13:
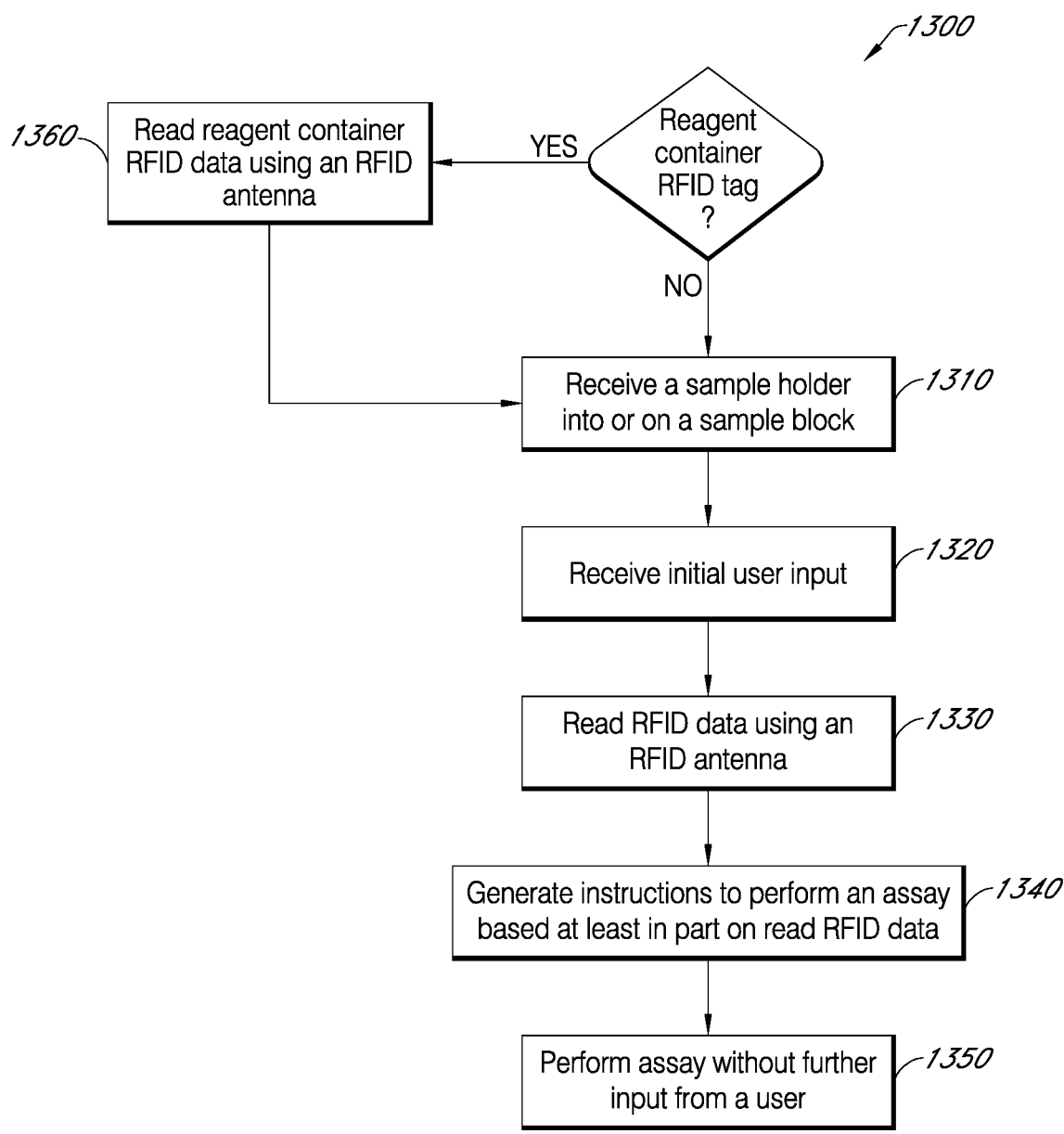
FIG. 13 shows a flow diagram of a method accord to an example embodiment.

Referring to FIG. 13, in certain embodiments, a method 1300 for performing a biological analysis in an automated fashion without intervention or any further input needed by a user after initial instructions have been sent to begin an assay. The inventors have found that method 1300 produces unexpected advantages over current practices in which a user must either manually input assay protocol information/instructions into a system for running an assay (e.g., by looking in a database by cross referencing a sample holder ID) and/or having obtaining assay protocol information/instructions by connecting to network such as a LAN or cloud database. These current practices are not only time consuming, but are less secure, since proprietary information resides at and/or is sent to sites that are remote from the instrument performing the assay. In many applications, it is critical that input and/or output data related to the assay be maintained in a secure environment to protect from unauthorized access to such data. Using embodiment of the current teaching, all input necessary to configure an assay protocol remains local with sample holder and sample holder RFID tag. In addition, sample holder RFID tags according to embodiments of the present teaching may be used configured to receive information related to output from the assay run, such as run parameters and conditions and/or data generated during the assay run.

The method 1300 may be used in conjunction with the sample holder RFID tag and/or reagent container RFID tag, for example, the sample holder RFID tag 318 and/or reagent container RFID tag 1032. When no reagent container RFID tag is present or being utilized, the method 1300 includes an element 1310 comprising placing a sample holder (e.g., sample holder 316) into or onto a biological analysis system (e.g., system 1000) and an element 1320 comprising receiving from a user an initial user input to initiate an assay. In some embodiments, the initial input from the user may also initiate transport and/or positioning of a sample holder, as discussed above herein regarding movement of sample block 302/thermal block 305 after placement of a sample holder into carrier, base, or tray 306.

The method 1300 also includes an element 1330 comprising reading at least some of the RFID data using one or more antennas associated with the sample holder RF ID tag, for example, one or both RF ID antennas 1200a, 1200b. The method 1300 further includes element 1340 comprising generating instructions to perform an assay based at least in part on the read RFID data. After receiving the initial user input, the method 1300 additionally includes an element 1350 comprising executing a set of steps to perform an assay on the sample holder without any further input or intervention from the user until the assay is completed. The set of steps may comprise or be provided by a protocol, which may be configured at least in part from data contained on the sample holder RFID tag. Optionally, additional input to an assay protocol after the initial user input, for example, to further customize the protocol.

In certain embodiments of the method 1300, one or more reagent containers each have their own RFID tag may be included in the system 1000 (e.g., reagent container 1030 and reagent container RFID tag 1032). In such embodiments, the method 1300 may also include an element 1360 comprising reading information from the reagent container RFID tag for one or more of the reagent containers. The method 1300 then includes any or all of the elements 1310 to 1350.

Figure 14:
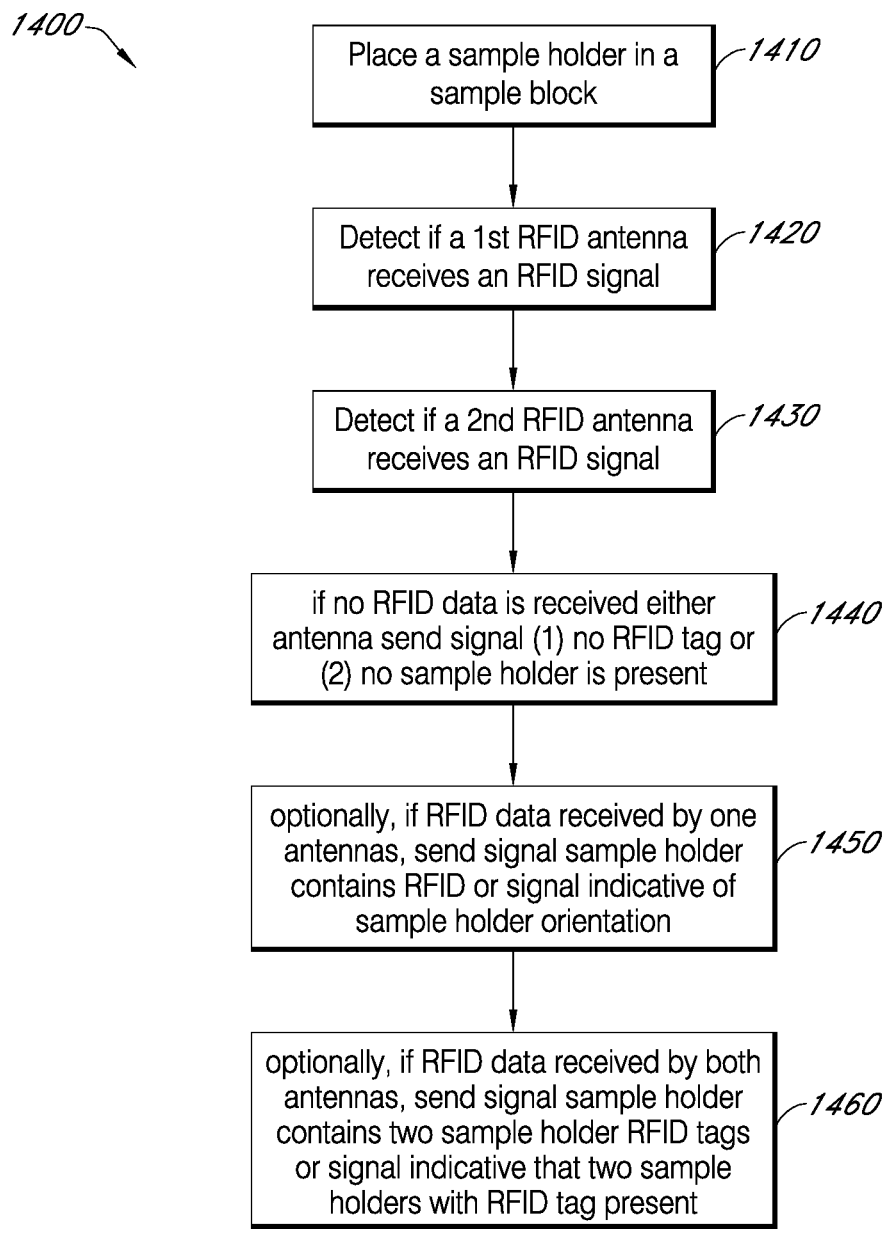
FIG. 14 shows a flow diagram of a method accord to an example embodiment.
Figure 15:
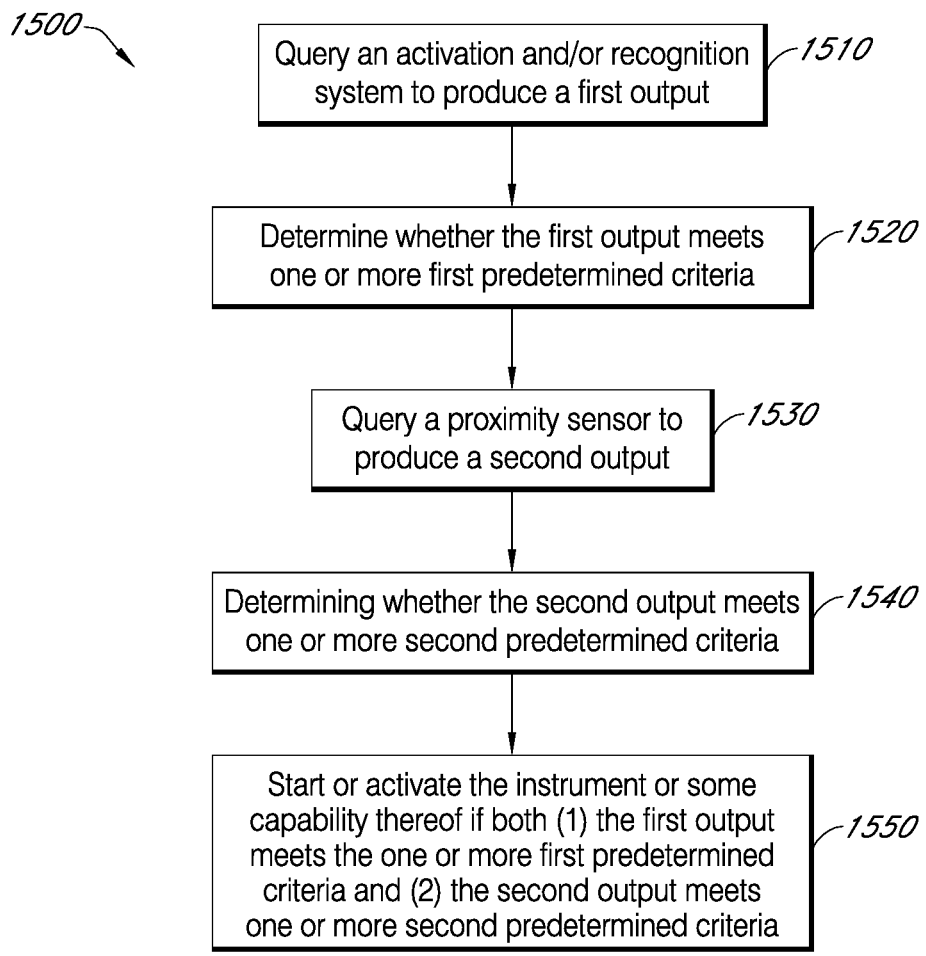
FIG. 15 shows a flow diagram of a method accord to an example embodiment.

Referring to FIG. 14, in certain embodiments, a method 1400 for performing a biological analysis is utilized to determine an orientation of a sample holder within a system or instrument, for example, the orientation of the sample holder 316 within the sample block 302. Advantageously, this allows the sample holder in some embodiments to be loaded without having to orient the sample holder be matched to a key. Additionally or alternatively, this may allow the same sample block (e.g., sample block 302) to be compatible with different types of sample holders, such as different types of plates or with various plates having different form features (e.g., to be compatible with both 96 well microtiter plates and 4, 8, or 12 well strips).

Using the system 1000 as an example, the method 1400 includes an element 1410 comprising placing the sample holder 316 in or on the sample block 302. The method 1400 also comprises elements 1420 and 1430 comprising determining if RFID data from sample holder RFID tag 318 is being detected from either or both RFID antennas 1200a, 1200b. if no RFID data is received by either antenna 1200a, 1200b, the method 1400 includes element 1440 of generating either (1) producing or generating a signal indicative that the sample holder 316 does not contain an RFID tag or (2) producing or generating a signal indicative that no sample holder is present. If other means, either active or passive, are used for determining the presence of the sample holder 316, then the system would be configured to utilize the second option. Additionally or alternatively, the system may be configured to produce or generate an uncertainty signal if the possibility of a faulty RFID tag is suspected (e.g., based on an antenna signal that is ambiguous or if other means exists for validating the presence of an RFID tag on the sample holder).

Optionally, the method 1400 may include an element 1450 comprising, if RFID data is received by one of the RFID antennas, then generating at least one of (1) a signal indicative that the sample holder 302 contains a sample holder RFID 318 or (2) a signal indicative of an orientation of the sample holder 316. In certain embodiments, the inventors have discovered that detection of the orientation is accomplished by configuring the antennas 1200a, 1200b, the sample holder 316, and the RFID tag 318 so that when the sample holder 316 is oriented as shown in FIGS. 3C, 3D, the signal from the RFID tag 318 is strong enough to be received by antenna 1200a, but the signal to antenna 1200b is too weak to be received. Conversely, if the sample holder 316 is rotated 180 degrees from that shown in FIGS. 3C, 3D, then the signal from the RFID tag 318 is strong enough to be received by antenna 1200b, but the signal to antenna 1200a is too weak to be received. In this manner, the orientation of the sample holder 316 can be detected based on the signal or lack of signal in antennas 1200a, 1200b. Additionally or alternatively, a single RFID device 1202a or b, and/or a single RFID antenna 1200a or b, may be used to determine the orientation of sample holder 316 based on the strength of the signal received from the RFID tag 318.

The inventors have discovered that there is an advantage in separating the antennas 1200a, 1200b from the RFID devices 1202a, 1202b. In certain embodiments, communication between antennas 1200a, 1200b and RFID devices 1202a, 1202b is provided by a wire between each antenna and the corresponding RFID device. By separating in this way, the inventors have found that the relatively small antennas 1200a, 1200b (compared to devices 1202a, 1202b) can be placed above the sample holder 316 and/or sample block 302 so that a relatively week signal from RFID tag can be received by the antenna that is closer to the RFID tag.

Optionally, the method 1400 may include an element 1460 comprising, if RFID data is received by both of the RFID antennas 1200a, 1200b, than generating (1) a signal indicative that the sample holder 316 contains two sample holder RFID tags 318 or (2) a signal indicative that two sample holders 316 with sample the holder RFID tag 318 are present.

In certain embodiments, a method 1500 of using an instrument or system (e.g., the system 1000) comprises an element 1510 including querying an activation and/or recognition system to produce a first output, the activation and/or recognition system comprising one or more of a voice activation and/or recognition system or a face activation and/or recognition system. For example, the activation and/or recognition system may comprise the image system 1017 and/or the voice system 1018 discussed above herein.

The method 1500 further comprises an element 1520 including determining whether the first output meets one or more first predetermined criteria.

The method 1500 further comprises an element 1530 including querying a proximity sensor to produce a second output. For example, the proximity sensor may comprise the proximity sensor 1020 discussed above herein.

The method 1500 further comprises an element 1540 including determining whether the second output meets one or more second predetermined criteria.

The method 1500 further comprises an element 1550 including starting, powering up, activating, or otherwise using a capability or data of the instrument if both (1) the first output meets the one or more first predetermined criteria and (2) the second output meets one or more second predetermined criteria.

In certain embodiments, the method 1500 of using the instrument comprise a method of starting, powering up, or activating the instrument and/or a method of utilizing or initiating certain capabilities of the instrument or of utilizing or granting access to information stored in the system or in a database to which the instrument has access.

It will be appreciated by a person skilled in the art that numerous variations and/or modifications may be made to the present disclosure as shown in the specific embodiments without departing from the scope of the present disclosure as broadly described. The present embodiments are, therefore, to be considered in all respects to be illustrative and not restrictive.

The invention claimed is:

1. A biological analysis system comprising:
   a sample block configured to hold a biological sample and a base configured to hold the sample block, the sample block comprising a first connector;
   a first driver coupled to a second connector;
   a cover disposed to cover the sample block, the cover comprising a third connector;

a cover carrier configured to hold the cover, the cover carrier comprising a fourth connector;

a second driver coupled to the cover carrier; and a controller communicatively coupled to the first driver and to the second driver, the controller configured to:
engage the cover and/or the sample block with the cover carrier using the second driver; and
engage the first connector with the second connector and secure the sample block to the base using the first driver.

2. The system as claimed in claim 1, wherein the connectors are electrical connectors configured to provide electrical power and/or communication between the system and the sample block and between the system and the cover.

3. The system as claimed in claim 1, further comprising:
a third driver, being communicatively coupled to the controller;
wherein the controller is configured to secure the cover to the cover carrier using the third driver.

4. The system as claimed in claim 3, wherein the controller is configured to:
disengage the cover from the cover carrier using the third driver; and
disengage the third connector from the fourth connector using the second driver to separate the cover carrier from the cover.

5. The system as claimed in claim 3, wherein the controller is configured to disengage the third connector from the fourth connector using the third driver by moving a linkage from a first position to release the cover from the cover carrier to a second position to separate the third connector from the fourth connector.

6. The system as claimed in claim 1, wherein the cover is a heated cover.

7. A biological analysis system comprising:
a sample block comprising a first connector and a base configured to hold the sample block;
a heated cover comprising a third connector and a cover carrier comprising a fourth connector, the cover carrier being configured to hold the heated cover;
a first drive mechanism coupled to a second connector, the first drive mechanism being configured to engage the sample block;
a second drive mechanism coupled to the cover carrier, the second drive mechanism being configured to engage the heated cover; and
a controller communicatively coupled to the first and second drive mechanisms,
wherein the controller is configured to, based on a first command, automatically operate the first drive mechanism to releasably engage the sample block with the base, and automatically operate the second drive mechanism to releasably engage the heated cover with the cover carrier.

8. The system as claimed in claim 7, wherein the controller is configured to, based on a second command, automatically operate the first drive mechanism to disengage the sample block from the base, and automatically operate the second drive mechanism to disengage the heated cover from the cover carrier.

9. The system as claimed in claim 7, further comprising a third drive mechanism and a fourth drive mechanism, and wherein, based on the first command, the third drive mechanism is configured to move the base and sample block to an open position and the fourth drive mechanism is configured to move the heated cover and cover carrier to a raised position.

10. The system as claimed in claim 8, wherein, based on the second command, a third drive mechanism is configured to move the base and sample block to an open position and a fourth drive mechanism is configured to move the heated cover and cover carrier to a lowered position.

* * * * *